US010834548B2

(12) United States Patent
Mesirow et al.

(10) Patent No.: US 10,834,548 B2
(45) Date of Patent: Nov. 10, 2020

(54) GEOLOCATION SYSTEM

(71) Applicant: PricewaterhouseCoopers LLP, New York, NY (US)

(72) Inventors: Robert Mesirow, Falls Church, VA (US); Alec Massey, Arlington, VA (US); Devin Yaung, Washington, DC (US)

(73) Assignee: PricewaterhouseCoopers LLP, New York, NY (US)

(*) Notice: Subject to any disclaimer, the term of this patent is extended or adjusted under 35 U.S.C. 154(b) by 0 days.

(21) Appl. No.: 16/657,623

(22) Filed: Oct. 18, 2019

(65) Prior Publication Data

US 2020/0128370 A1 Apr. 23, 2020

Related U.S. Application Data

(60) Provisional application No. 62/855,320, filed on May 31, 2019, provisional application No. 62/811,805, (Continued)

(51) Int. Cl.
*H04W 4/33* (2018.01)
*H04W 4/80* (2018.01)
(Continued)

(52) U.S. Cl.
CPC ............ *H04W 4/33* (2018.02); *G01S 5/0054* (2013.01); *G01S 5/16* (2013.01); *H04B 17/318* (2015.01);
(Continued)

(58) Field of Classification Search
CPC .......... H04W 4/33; H04W 4/70; H04W 4/02; H04W 4/38; H04W 4/021; H04W 4/80; H04W 80/02; H04W 52/02; H04W 52/0261; H04W 64/00; H04W 64/003; H04W 64/006; H04W 16/20; H04W 16/225; H04W 88/00; H04W 88/02;
(Continued)

(56) References Cited

U.S. PATENT DOCUMENTS 9,374,678 B2* 6/2016 Gupta et al. .......... H04W 4/043
9,736,644 B2* 8/2017 Meredith et al. ..... H04W 4/023
(Continued)

*Primary Examiner* — Meless N Zewdu
(74) *Attorney, Agent, or Firm* — Morrison & Foerster LLP

(57) ABSTRACT

An indoor geolocation system for determining a location in three-dimensional space includes a plurality of base stations and a mobile device movable about an indoor environment in three dimensions. The mobile device detects electromagnetic signals in the indoor environment emitted by devices other than the base stations, and generates a signal profile based on the signals. The mobile device transmits the signal profile to one or more of the base stations, which forward the signal profile to a remote server. The system determines a location of the in three-dimensional space of the mobile device by comparing the signal profile to data regarding signal profiles at a plurality of locations in the indoor environment. The data regarding signal profiles in the indoor environment may have been captured by a detection device other than the mobile device at a time prior to the detection of the electromagnetic signals by the mobile device.

19 Claims, 24 Drawing Sheets

Related U.S. Application Data filed on Feb. 28, 2019, provisional application No. 62/748,079, filed on Oct. 19, 2018.

(51) Int. Cl.

| | |
|---|---|
| *H04W 80/02* | (2009.01) |
| *H04W 64/00* | (2009.01) |
| *G01S 5/16* | (2006.01) |
| *H04B 17/318* | (2015.01) |
| *H04W 52/02* | (2009.01) |
| *G01S 5/00* | (2006.01) |

(52) U.S. Cl.
CPC ......... *H04W 4/80* (2018.02); *H04W 52/0261* (2013.01); *H04W 64/003* (2013.01); *H04W 80/02* (2013.01)

(58) Field of Classification Search
CPC ..... H04W 88/08; H04W 4/023; H04W 4/024; H04W 4/025; H04W 4/026; H04W 4/027; H04W 4/029; G01S 5/00; G01S 5/0054; G01S 5/16; G01S 5/012; G01S 5/013; G01S 5/011; G01S 5/016; G01S 5/01; G01S 2201/02; G01S 2201/025; G01S 2205/02; G01S 5/10; G01S 5/14; G01S 5/30; G01S 13/876; G01S 13/878; H04B 17/318; H04B 17/391; H04B 10/1149; H04L 67/30
See application file for complete search history.

(56) References Cited

U.S. PATENT DOCUMENTS

| | | | |
|---|---|---|---|
| RE47,894 E * | 3/2020 | Wang | H04B 1/707 |
| 2010/0277208 A1* | 11/2010 | Fullerton et al. | 327/129 |
| 2010/0309051 A1* | 12/2010 | Moshfeghi | 342/378 |
| 2010/0309059 A1* | 12/2010 | Wu et al. | 342/463 |
| 2013/0009821 A1* | 1/2013 | Steer et al. | 342/417 |
| 2016/0146922 A1* | 5/2016 | Moshfeghi | G01S 5/0252 |
| 2020/0049832 A1* | 2/2020 | Sevak et al. | G01S 19/14 |
| 2020/0128370 A1* | 4/2020 | Mesiro et al. | H04W 4/33 |

* cited by examiner

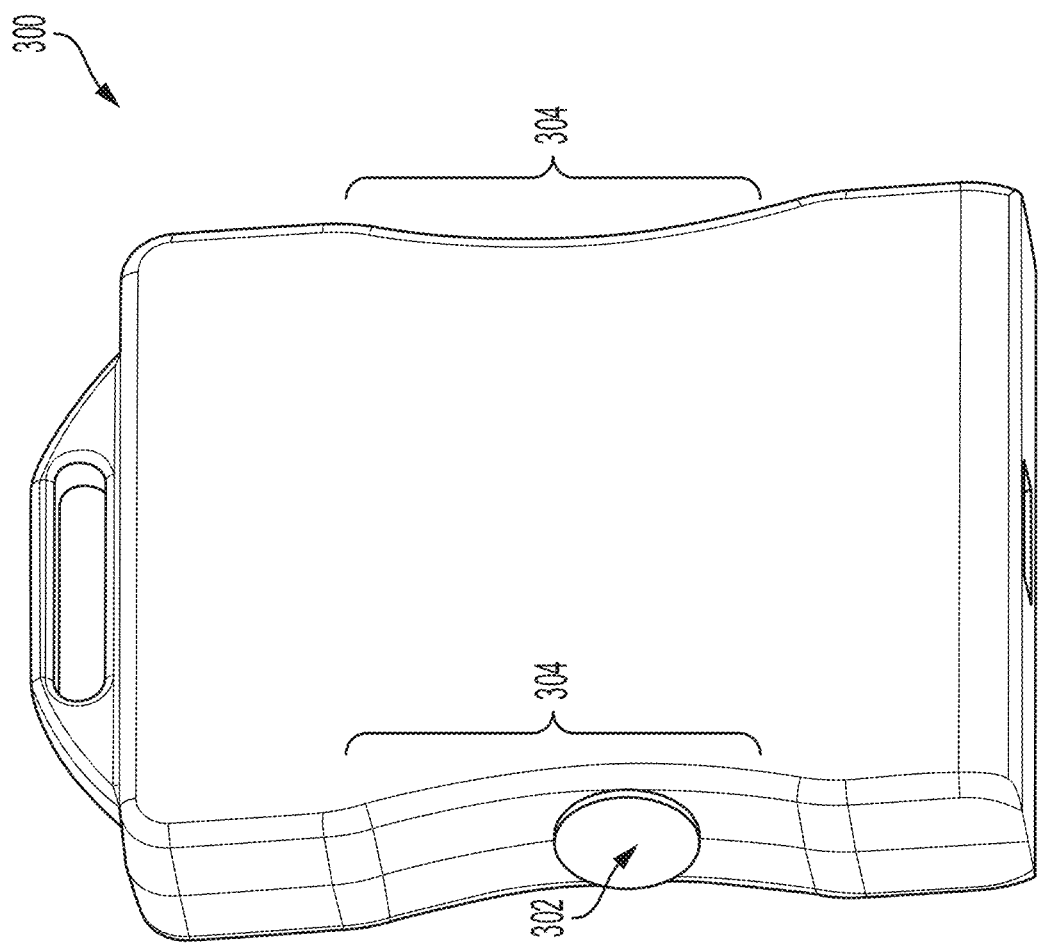

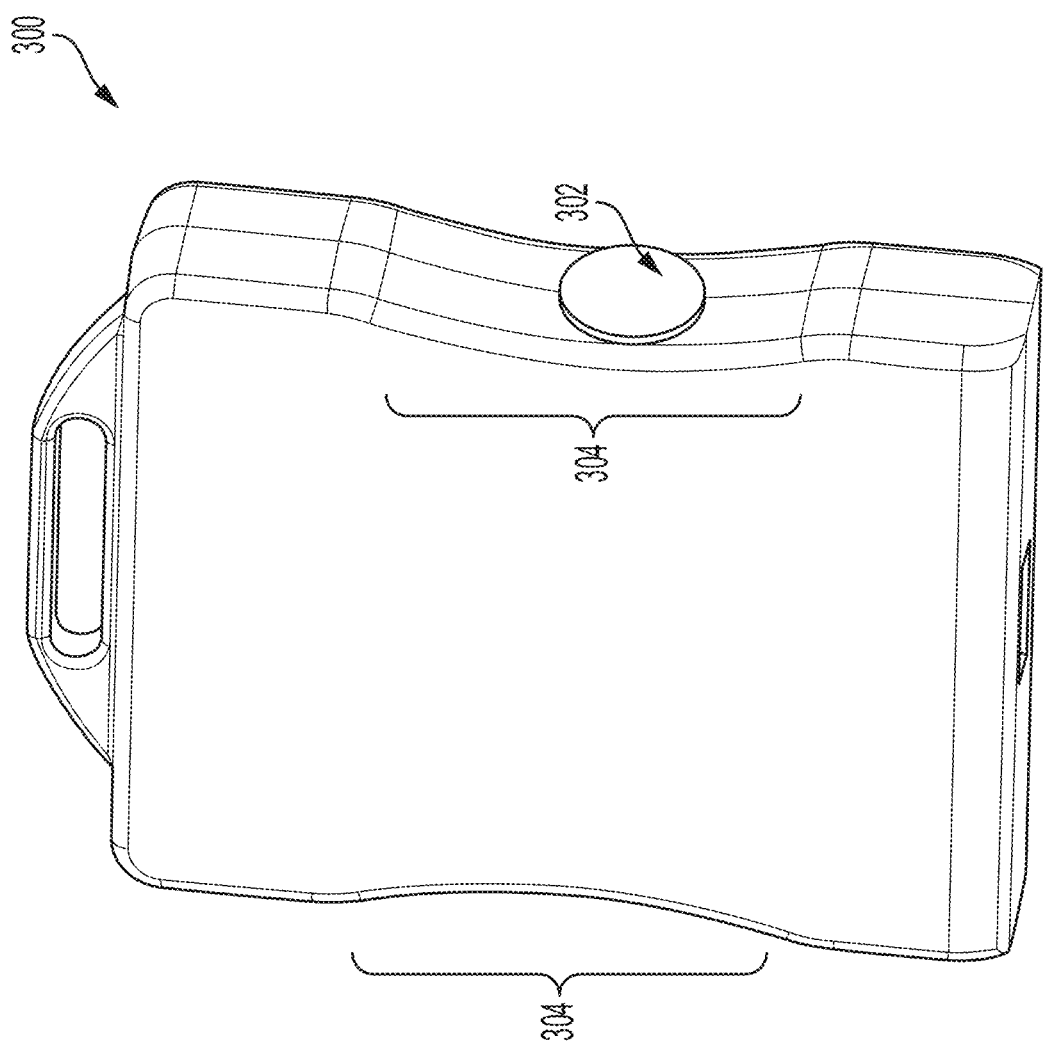

Service Alerts Portal 🏠 Home ⚠ Alerts ④ 🔲 Devices ① ⚙ Admin ▾     Internal | GP Testing ▾   Logout⤴

Active Notifications

| Name | Picture | Device | Location | Received | Presses | |
|---|---|---|---|---|---|---|
| GCPM TEST ONLY | ◯◗ | GCPM TEST ONLY (3E8029) | 1410 Inside | 01-14-2019 02:15:50 PM | 1 | ✓ Acknowledge |
| GCPM TEST ONLY | ◯◗ | GCPM TEST ONLY (3E8029) | 1108 Inside | 01-12-2019 02:08:50 PM | 1 | ✓ Acknowledge |
| GCPM TEST ONLY | ◯◗ | GCPM TEST ONLY (3E8029) | 1409 Inside | 01-11-2019 02:33:47 PM | 1 | ✓ Acknowledge |
| GCPM TEST ONLY | ◯◗ | GCPM TEST ONLY (3E8029) | 1408 Inside | 01-11-2019 02:36:18 PM | 1 | ✓ Acknowledge |

0 selected / 4 total

GEOLOCATION SYSTEM

CROSS-REFERENCE TO RELATED APPLICATIONS

This application claims the benefit of U.S. Provisional Application No. 62/748,079, filed Oct. 19, 2018, U.S. Provisional Application No. 62/811,805, filed Feb. 28, 2019, and U.S. Provisional Application No. 62/855,320, filed May 31, 2019, the entire contents of each of which are incorporated herein by reference.

FIELD

This disclosure relates generally to geolocation and to wireless communication systems, and more specifically to improved systems and methods for geolocation, including indoor geolocation with improved accuracy in the vertical (e.g., z-axis direction), and to wireless alarm devices, systems, and related techniques.

BACKGROUND

Geolocation systems are used to determine locations of persons and objects, and have many applications in transportation, logistics, asset tracking, systems monitoring, security, and personal safety. Global positioning system (GPS)-based wireless communication devices may utilize geolocation data provided by a global navigation satellite system to locate and track a user of such a device. Radio-frequency (RF)-based wireless communication devices may utilize a local infrastructure of radio wave transmitters and receivers to locate and track a user of such a device.

In addition to determining a location of a person or object longitudinally and/or latitudinally, some geolocation systems may also determine a location of a person or object in the vertical direction (e.g., the z-axis direction). This vertical-direction location may correspond to an altitude or elevation of a person or object relative to the earth's surface, relative to a building (e.g., relative to one or more floors of a multi-story building), and/or relative to a vehicle (e.g., a cruise ship or cargo ship) or any other device. Geolocation systems capable of determining a location in a vertical direction may be useful in indoor environments, and particularly in multi-story indoor environments, where persons and/or objects may move between different floors of a building or large vehicle such that their vertical geolocation may change with little or no change to their horizontal (e.g., latitudinal and/or longitudinal) geolocation. Thus, vertical geolocation systems may be used to determine, for example, what floor of a large building a person or object is located on.

SUMMARY

Known systems for geolocation, and particularly indoor geolocation, have several problems. First, they are often not sufficiently accurate in the vertical direction, offering insufficient precision for reliably determining, for example, what floor of a building someone or something is located on. Second, known systems that have attempted to address issues of vertical-axis accuracy for indoor geolocation have introduced additional problems. Some systems rely on deploying arrays of dedicated beacon devices by which to triangulate a person or device, but these systems suffer from high costs due to the cost of deploying the dedicated beacon devices, and high costs in time and resources associated with maintaining beacon deployments. Some systems rely on arrays of beacons included in specific devices such as Wi-Fi access points, but these systems suffer from inadequate coverage due to the specific devices only being in range of certain areas of an environment being monitored. Failures in beacon-based systems may be caused, for example, by beacon devices being unplugged/losing power, damaged, or stolen; or by incomplete coverage of an environment due to the requirement that all regions of the environment be covered by a functioning dedicated device at all times. Furthermore, many indoor geolocation systems suffer from poor reliability due to the requirement that location devices used to locate their carriers (e.g., wearable devices) are required to repeatedly pair and re-pair to different Wi-Fi access points, which is a process that is and failure-prone, or the requirement that location devices pair to a smart phone or tablet, which requires every person to carry an expensive device that is constantly connected to the internet.

Accordingly there is a need for improved indoor geolocation systems having accurate z-axis location determination capabilities, having reliable connectivity, allowing communication over decreased bandwidth requirements, not requiring the deployment and use of dedicated beacons for geolocation, and not requiring one-to-one pairing of a location device to a smart phone or tablet. Thus, disclosed herein are improved systems and methods for indoor geolocation that may address the above needs.

In some embodiments, a system for indoor geolocation determines a location of a mobile electronic device, such as a wearable device, within a three-dimensional indoor environment, outdoor environment or combination of indoor and outdoor environments. The system comprises the mobile electronic device to be located, a plurality of low-power wide-area network (LPWAN) devices deployed in and/or around the indoor environment, and a plurality of resident electronic devices native to the indoor environment that emit electromagnetic signals. The geolocation system comprises two stages: a calibration or mapping stage, followed by a device geolocation stage.

At the calibration/mapping stage, the indoor environment is surveyed using a device comprising one or more antennas capable of detecting the electromagnetic signals that are emitted by the plurality of devices native to the indoor environment. Multiple scans of the same location may be performed. That is, rather than relying on specific signals from predetermined and/or dedicated geolocation beacons, the device detects electromagnetic signals from Wi-Fi access points, Bluetooth devices, portable electronic devices such as phones and tablets, personal computers, and/or any number of IoT devices such as network-enabled appliances and infrastructure equipment. Using data regarding characteristics of the signals collected at various different physical locations in the indoor environment a signal map of the indoor environment is generated and stored, wherein the signal map comprises information about the kinds of signals that can be expected to be detected at various different physical locations in the indoor environment.

At the geolocation stage, the system determines the current location of the mobile electronic device to be located (which may be, for example, a wearable device (e.g., a wearable alert device) movable throughout the indoor environment). Upon a button or buttons on the mobile device being pressed, or upon an input being otherwise indicated, the mobile device takes a reading, using one or more antennas included in the mobile device, of electromagnetic signals that can be detected from its current location. In some embodiments, the mobile device can start a scan based on movement. The mobile device can either send the location once the device has stopped moving (last known location) or proceed to provide real time location updates as the device is in motion (RTLS). As with the calibration/mapping stage, these electronic signals are not detected from predetermined and/or dedicated beacons, but instead are detected from one or more of the same Wi-Fi access points, Bluetooth devices, portable electronic devices such as phones and tablets, personal computers, and/or IoT devices that were detected at the calibration/mapping stage.

In some embodiments, a first geolocation system for determining a location in three-dimensional space is provided, the first system comprising: a plurality of base stations, the plurality of base stations configured to receive data via low-power wide-area network communication, a mobile device movable about an environment in three dimensions, the mobile device comprising a set of one or more detection antennas configured to detect electromagnetic signals in the environment and a transmission device configured to transmit signals via low-power wide-area network communication; wherein the system is configured to: detect, via the set of one or more detection antennas of the mobile device, a plurality of electromagnetic signals in the environment; generate, at the mobile device, a signal profile based on the plurality of electromagnetic signals, wherein the signal profile comprises information about a subset of the plurality of electromagnetic signals; and transmit, via the transmission device of the mobile device using low-power wide-area network communication, the signal profile to one or more of the plurality of base stations; determine, based on a comparison of the signal profile received by the one or more of the plurality of base stations to stored data regarding signal profiles at a plurality of locations in the environment, a location in three-dimensional space of the mobile device.

In some embodiments of the first geolocation system, the system is further configured to, in response to receiving the signal profile at the one or more of the plurality of base stations, transmit the signal profile from the one or more of the plurality of base stations to a remote server, wherein the determination of the location in three-dimensional space is made at the remote server.

In some embodiments of the first geolocation system, the plurality of electromagnetic signals in the environment comprises signals emitted by one or more of: Wi-Fi access points, Bluetooth devices, network-enabled appliances, network-enabled infrastructure devices, and IoT devices.

In some embodiments of the first geolocation system, the plurality of electromagnetic signals in the environment does not comprise signals emitted by one of more of the plurality of base stations.

In some embodiments of the first geolocation system, generating the signal profile based on the plurality of electromagnetic signals comprises comparing the plurality of electromagnetic signals to a predefined list of electromagnetic signals to select the subset of the plurality of electromagnetic signals based on the predefined list.

In some embodiments of the first geolocation system, the stored data regarding signal profiles at a plurality of locations in the environment comprises data captured by a detection device, other than the mobile device, at a time prior to the detection of the plurality of electromagnetic signals by the mobile device.

In some embodiments of the first geolocation system: the mobile device is configured to detect an input comprising an instruction to determine the location in three-dimensional space of the mobile device; and the detection of the plurality of electromagnetic signals in the environment is performed in response to detecting the input.

In some embodiments of the first geolocation system, the system is further configured to generate and display an alert regarding the determined location in three-dimensional space of the mobile device.

In some embodiments of the first geolocation system, one or more of the plurality of base stations is positioned inside the environment.

In some embodiments of the first geolocation system, one or more of the plurality of base stations is positioned outside the environment.

In some embodiments, a first geolocation method for determining a location in three-dimensional space is provided, the first method performed by a system comprising: a plurality of base stations, the plurality of base stations configured to receive data via low-power wide-area network communication, a mobile device movable about an environment in three dimensions, the mobile device comprising a set of one or more detection antennas configured to detect electromagnetic signals in the environment and a transmission device configured to transmit signals via low-power wide-area network communication; wherein the first method comprises: detecting, via the set of one or more detection antennas of the mobile device, a plurality of electromagnetic signals in the environment; generating, at the mobile device, a signal profile based on the plurality of electromagnetic signals, wherein the signal profile comprises information about a subset of the plurality of electromagnetic signals; and transmitting, via the transmission device of the mobile device using low-power wide-area network communication, the signal profile to one or more of the plurality of base stations; determining, based on a comparison of the signal profile received by the one or more of the plurality of base stations to stored data regarding signal profiles at a plurality of locations in the environment, a location in three-dimensional space of the mobile device.

In some embodiments, a first non-transitory computer-readable storage medium for determining a location in three-dimensional space is provided, the first storage medium storing instructions configured to be executed by a system comprising: a plurality of base stations, the plurality of base stations configured to receive data via low-power wide-area network communication, a mobile device movable about an environment in three dimensions, the mobile device comprising a set of one or more detection antennas configured to detect electromagnetic signals in the environment and a transmission device configured to transmit signals via low-power wide-area network communication; wherein the instructions are configured to cause the system to: detect, via the set of one or more detection antennas of the mobile device, a plurality of electromagnetic signals in the environment; generate, at the mobile device, a signal profile based on the plurality of electromagnetic signals, wherein the signal profile comprises information about a subset of the plurality of electromagnetic signals; and transmit, via the transmission device of the mobile device using low-power wide-area network communication, the signal profile to one or more of the plurality of base stations; determine, based on a comparison of the signal profile received by the one or more of the plurality of base stations to stored data regarding signal profiles at a plurality locations in the environment, a location in three-dimensional space of the mobile device.

In some embodiments, a second geolocation system for determining a location in three-dimensional space is provided, the second system comprising: a first device configured to detect a first plurality of electromagnetic signals in an environment, the first plurality of signals captured at a plurality of different locations in the environment; and a second device configured to detect a second plurality of electromagnetic signals in the environment, the second plurality of signals captured at a single location in the environment; wherein the system is configured to: receive, from the first device, data regarding the first plurality of electromagnetic signals, the data including information regarding the plurality of locations at which the first plurality of signals were captured; generate and store a model of the environment based on the first plurality of electromagnetic signals; receive, from the second device, data regarding the second plurality of electromagnetic signals; determine, based on a comparison of the second plurality of electromagnetic signals to the model of the environment, a location in three-dimensional space of the single location in the environment.

In some embodiments of the second geolocation system: the data regarding the first plurality of electromagnetic signals comprises a plurality of data points for a single location captured at a respective plurality of different points in time; and generating the model of the environment comprises accounting for a variation amongst the plurality of data points for the single location.

In some embodiments of the second geolocation system, accounting for the variation comprises calculating a standard deviation based on the plurality of data points.

In some embodiments of the second geolocation system, generating the model of the environment based on the first plurality of electromagnetic signals comprises applying an adjustment to one or more of the first plurality of signals to generate one or more adjusted signals, wherein the model is generated based on the one or more adjusted signals.

In some embodiments of the second geolocation system, wherein the adjustment is determined based on a difference between an antenna of the first device and an antenna of the second device.

In some embodiments, a second geolocation method for determining a location in three-dimensional space is provided, the second method performed by a system comprising: a first device configured to detect a first plurality of electromagnetic signals in an environment, the first plurality of signals captured at a plurality of different locations in the environment; and a second device configured to detect a second plurality of electromagnetic signals in the environment, the second plurality of signals captured at a single location in the environment; wherein the second method comprises: receiving, from the first device, data regarding the first plurality of electromagnetic signals, the data including information regarding the plurality of locations at which the first plurality of signals were captured; generating and storing a model of the environment based on the first plurality of electromagnetic signals; receiving, from the second device, data regarding the second plurality of electromagnetic signals; determining, based on a comparison of the second plurality of electromagnetic signals to the model of the environment, a location in three-dimensional space of the single location in the environment.

In some embodiments, a second non-transitory computer-readable storage medium for determining a location in three-dimensional space is provided, the second storage medium storing instructions configured to be executed by a system comprising: a first device configured to detect a first plurality of electromagnetic signals in an environment, the first plurality of signals captured at a plurality of different locations in the environment; and a second device configured to detect a second plurality of electromagnetic signals in the environment, the second plurality of signals captured at a single location in the environment; wherein the instructions are configured to cause the system to: receive, from the first device, data regarding the first plurality of electromagnetic signals, the data including information regarding the plurality of locations at which the first plurality of signals were captured; generate and store a model of the environment based on the first plurality of electromagnetic signals; receive, from the second device, data regarding the second plurality of electromagnetic signals; determine, based on a comparison of the second plurality of electromagnetic signals to the model of the environment, a location in three-dimensional space of the single location in the environment.

One example embodiment provides a wireless alarm device. The wireless alarm device includes a wireless receiver configured to detect a wireless local area network (LAN) signal, wherein the wireless LAN signal is at least one of a Wi-Fi signal and a Bluetooth signal. The wireless alarm device further includes a wireless transmitter configured to transmit a radio frequency (RF) signal including data obtained from the wireless LAN signal, the data pertaining to at least one of: a media access control (MAC) address associated with a source of the wireless LAN signal; and a received signal strength indication (RSSI) value associated with a source of the LAN signal. The wireless alarm device further includes a controller configured to instruct the wireless transmitter to transmit the RF signal. The wireless alarm device further includes at least one button configured to be actuated, wherein actuation of the at least one button permits: the wireless receiver to detect the wireless LAN signal; and the wireless transmitter to transmit the RF signal. In some cases, the RF signal is of a frequency in a 902 MHz ISM band. In some cases, the RF signal further includes data pertaining to at least one of: a status of the wireless alarm device; and a power level of a power supply of the wireless alarm device. In some cases, the at least one button includes first and second buttons disposed on opposing sides of a housing of the wireless alarm device. In some cases, at least one button includes first, second, and third buttons disposed on a front side of a housing of the wireless alarm device. In some cases, the wireless alarm device further includes an antenna communicatively coupled with the wireless receiver and configured to receive the wireless LAN signal. In some such instances, the antenna is a printed circuit board antenna of planar meander line antenna configuration. In some cases, the wireless alarm device further includes at least one of: an optical output device configured to emit light in response to activation of an alarm mode of the wireless alarm device; and an audio output device configured to emit sound in response to activation of an alarm mode of the wireless alarm device. In some such instances, at least one of: the optical output device is further configured to emit light indicative of a power level of a power supply of the wireless alarm device; and the audio output device is further configured to emit sound indicative of a power level of a power supply of the wireless alarm device.

Another example embodiment provides a method of wireless communication via a wireless alarm device. The method includes detecting a wireless local area network (LAN) signal that is at least one of a Wi-Fi signal and a Bluetooth signal. The method further includes obtaining from the wireless LAN signal at least one of: a media access control (MAC) address associated with a source of the wireless LAN signal; and a received signal strength indication (RSSI) value associated with a source of the wireless LAN signal. The method further includes transmitting a radio frequency (RF) signal including data pertaining to the at least one of the MAC address and the RSSI value. In some cases, detecting the wireless LAN signal occurs only upon actuation of at least one button of the wireless alarm device.

Another example embodiment provides a method of monitoring personnel safety. The method includes forwarding, via a wireless alarm device, data pertaining to a location of the wireless alarm device to an internet-of-things (IoT) service provider, wherein the forwarded data includes data obtained via the wireless alarm device from a wireless local area network (LAN) signal sourced by at least one wireless LAN access point within range of the wireless alarm device. The method further includes forwarding, via the internet, data pertaining to the location of the wireless alarm device to at least one of: a server database; a backend customer; and a backend service provider. In some cases, the data obtained via the wireless alarm device from the wireless LAN signal is obtained only upon actuation of at least one button of the wireless alarm device. In some embodiments, a wireless alarm device is provided, the device wireless alarm device comprising: a wireless receiver configured to detect a wireless local area network (LAN) signal, wherein the wireless LAN signal is at least one of a Wi-Fi signal and a Bluetooth signal; a wireless transmitter configured to transmit a radio frequency (RF) signal including data obtained from the wireless LAN signal, the data pertaining to at least one of: a media access control (MAC) address associated with a source of the wireless LAN signal; and a received signal strength indication (RSSI) value associated with a source of the LAN signal; a controller configured to instruct the wireless transmitter to transmit the RF signal; and at least one button configured to be actuated, wherein actuation of the at least one button permits: the wireless receiver to detect the wireless LAN signal; and the wireless transmitter to transmit the RF signal.

In some embodiments of the wireless alarm device, the RF signal is of a frequency in a 902 MHz ISM band.

In some embodiments of the wireless alarm device, the RF signal further includes data pertaining to at least one of: a status of the wireless alarm device; and a power level of a power supply of the wireless alarm device.

In some embodiments of the wireless alarm device, at least one button comprises first and second buttons disposed on opposing sides of a housing of the wireless alarm device.

In some embodiments of the wireless alarm device, the at least one button comprises first, second, and third buttons disposed on a front side of a housing of the wireless alarm device.

In some embodiments of the wireless alarm device, the wireless alarm device further comprises an antenna communicatively coupled with the wireless receiver and configured to receive the wireless LAN signal.

In some embodiments of the wireless alarm device, the antenna is a printed circuit board antenna of planar meander line antenna configuration.

In some embodiments of the wireless alarm device, the wireless alarm device further comprises at least one of: an optical output device configured to emit light in response to activation of an alarm mode of the wireless alarm device; and an audio output device configured to emit sound in response to activation of an alarm mode of the wireless alarm device.

In some embodiments of the wireless alarm device, at least one of: the optical output device is further configured to emit light indicative of a power level of a power supply of the wireless alarm device; and the audio output device is further configured to emit sound indicative of a power level of a power supply of the wireless alarm device.

In some embodiments, a method of wireless communication via a wireless alarm device is provided, the method of wireless communication comprising: detecting a wireless local area network (LAN) signal that is at least one of a Wi-Fi signal and a Bluetooth signal; obtaining from the wireless LAN signal at least one of: a media access control (MAC) address associated with a source of the wireless LAN signal; and a received signal strength indication (RSSI) value associated with a source of the wireless LAN signal; and transmitting a radio frequency (RF) signal including data pertaining to the at least one of the MAC address and the RSSI value.

In some embodiments of the method of wireless communication, detecting the wireless LAN signal occurs only upon actuation of at least one button of the wireless alarm device.

In some embodiments, a method of monitoring personal safety is provided, the method of monitoring personal safety comprising: forwarding, via a wireless alarm device, data pertaining to a location of the wireless alarm device to an internet-of-things (IoT) service provider, wherein the forwarded data includes data obtained via the wireless alarm device from a wireless local area network (LAN) signal sourced by at least one wireless LAN access point within range of the wireless alarm device; and forwarding, via the internet, data pertaining to the location of the wireless alarm device to at least one of: a server database; a backend customer; and a backend service provider.

In some embodiments of the method of monitoring personal safety, the data obtained via the wireless alarm device from the wireless LAN signal is obtained only upon actuation of at least one button of the wireless alarm device.

In some embodiments, any one or more of the features of any one or more of the embodiments set forth above may be combined with one another, and/or with other features or aspects of any method, system, technique, or device disclosed herein. The subject matter of this application may involve, in some cases, interrelated products, alternative solutions to a particular problem, and/or a plurality of different uses of a single system or article.

BRIEF DESCRIPTION OF THE FIGURES

FIGS. 3A and 3B show a wearable geolocation device, in accordance with some embodiments.

FIGS. 6A-6K show various screens of a graphical user interface for an indoor geolocation system, in accordance with some embodiments.

Figure 1:
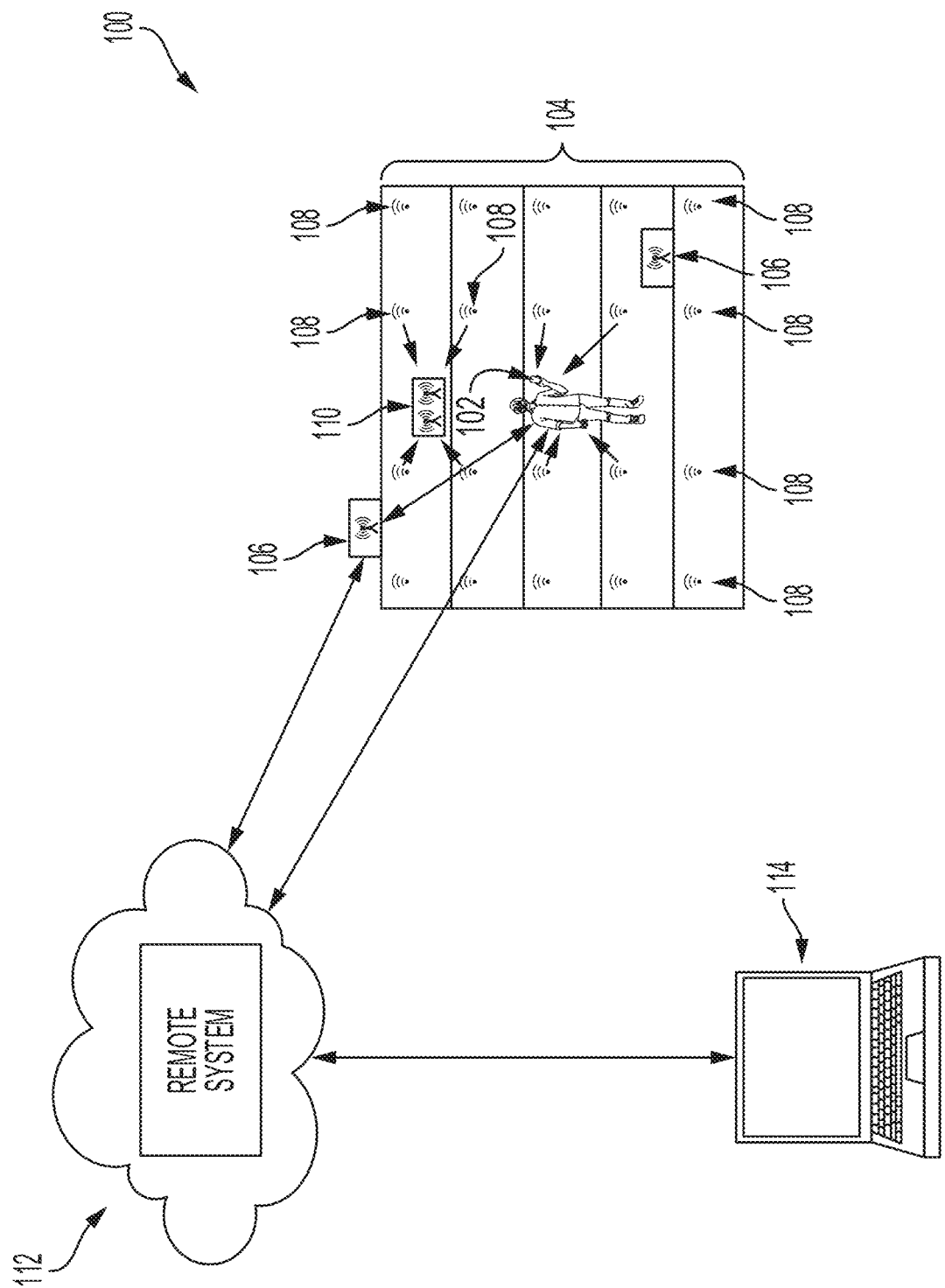
FIG. 1 shows a schematic representation of a system for indoor geolocation, in accordance with some embodiments.

These and other features of the present embodiments may be understood better by reading the following detailed description, taken together with the figures herein described. In the drawings, identical or nearly identical components illustrated in multiple figures may be represented by a like reference numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION OF THE FIGURES

As described above, in some embodiments, a system for indoor geolocation determines a location of a mobile electronic device, such as a wearable device, within a three-dimensional indoor environment. In some embodiments, the system comprises the mobile electronic device to be located, a plurality of low-power wide-area network (LPWAN) devices deployed in and/or around the indoor environment, and a plurality of resident electronic devices native to the indoor environment that emit electromagnetic signals. In some embodiments, the geolocation system operates in accordance with at least two stages: a calibration or mapping stage, followed by a device geolocation stage.

Figure 4:
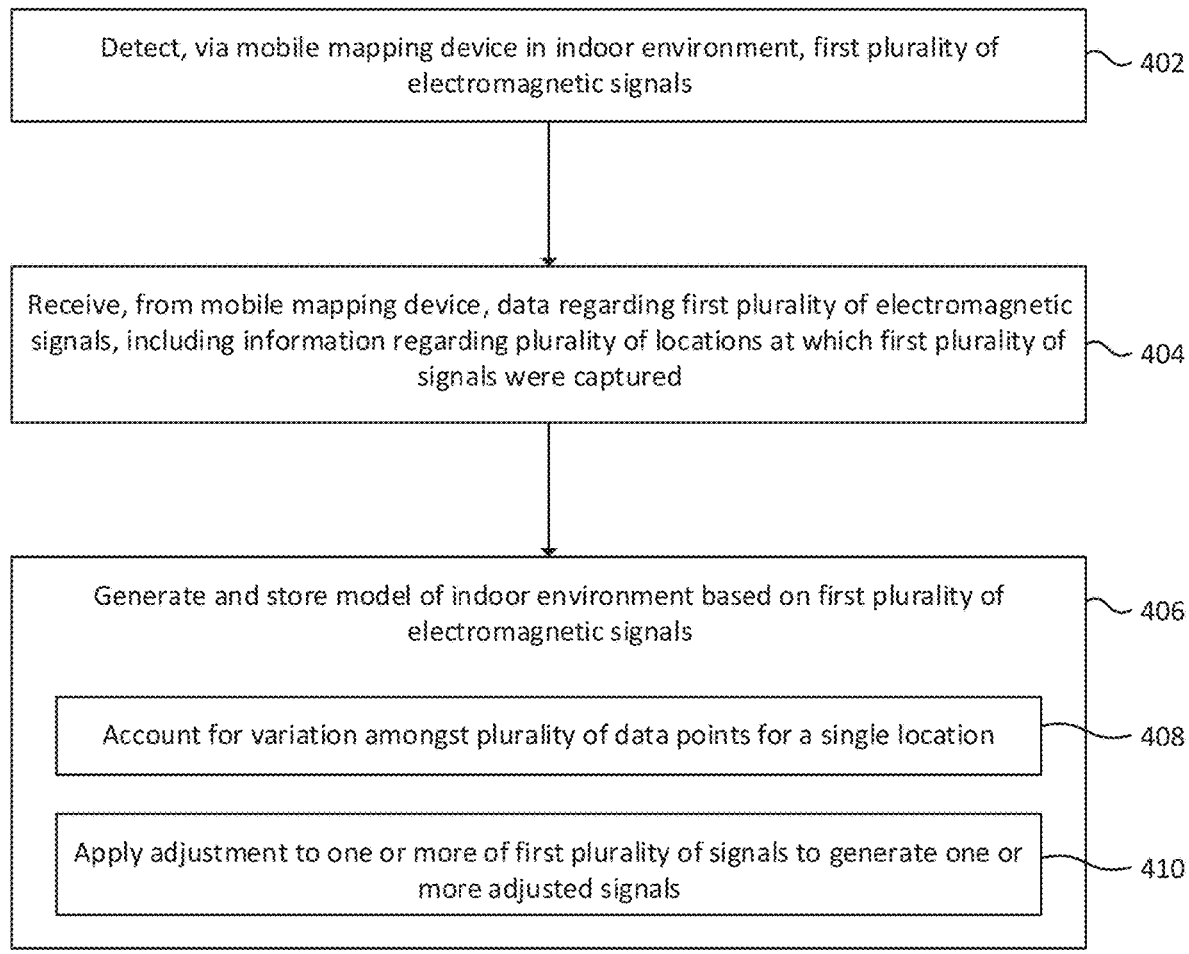
FIG. 4 shows a flow chart showing a method for calibrating a geolocation system, in accordance with some embodiments.
Figure 5:
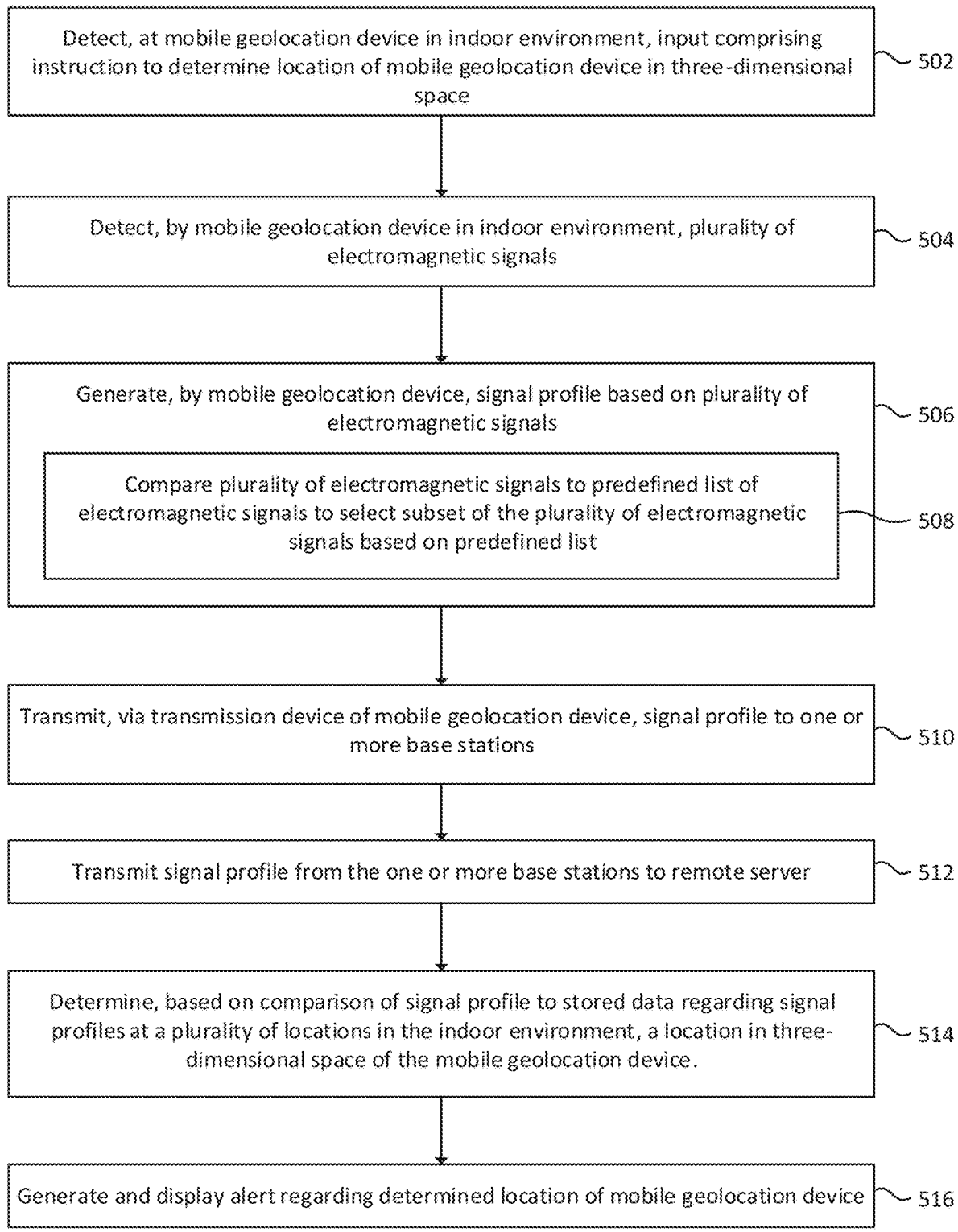
FIG. 5 shows a flow chart showing a method for determining a location of a portable electronic device using a geolocation system, in accordance with some embodiments.

Below, FIG. 1 depicts an exemplary system for indoor geolocation; FIGS. 2A-B and 3A-B depict exemplary mobile electronic devices (e.g., geolocation devices) to be located in a system for indoor geolocation; FIGS. 4 and 5 show flowcharts depicting methods for indoor geolocation; FIGS. 6A-6K depict graphical user interfaces for a system for indoor geolocation; and FIG. 7 depicts an exemplary computer.

FIG. 1 shows a schematic representation of a system 100 for indoor geolocation, in accordance with some embodiments. While systems such as system 100 are referred to herein as systems for "indoor" geolocation, a person of skill in the art would appreciate that systems such as those disclosed herein may be readily adapted for use in fully-indoor, fully-outdoor, and/or partially-indoor and partially-outdoor environments. The term "indoor geolocation" is used, in part, because it refers to one useful application of the three-dimensional geolocation capabilities of the systems disclosed herein. In the example of FIG. 1, system 100 is configured to perform geolocation in three-dimensional environment 104, which is depicted as an environment inside a multi-story building such as a hotel or hospital. In some embodiments, the system is able to also operate outside in the vicinity of a multi-story building, for example, in parking lots and pool areas.

As shown in FIG. 1, system 100 comprises mobile geolocation device 102, which may be any mobile/portable electronic device configured to be locatable in environment 104 by system 100.

In some embodiments, device 102 may be configured to be worn by a person (e.g., an employee of a hotel, hospital, or other employee working in a multi-story indoor environment), carried by a person, and/or attached to one or more movable objects (e.g., hotel housekeeping carts, hospital equipment carts, etc.) to be tracked.

In some embodiments, system 100 comprises a plurality of mobile devices, of which device 102 may be a single device, such that each of the multiple mobile devices may be locatable in environment 104. In some embodiments, each of a plurality of mobile devices are identifiable by system 100, such as by a unique device identifier or other metadata. In this way, the location of multiple persons and/or assets may be tracked within the same environment. This disclosure will refer to characteristics of device 102, but those characteristics may be shared by one or more additional devices that may be deployed in a multi-device environment.

In some embodiments, device 102 may comprise one or more antennas configured to detect electromagnetic signals emitted by one or more resident devices 108 in environment 104. Resident devices 108 may comprise one or more of any of the following electronic devices: Wi-Fi access points, Bluetooth devices, portable electronic devices such as phones and tablets, personal computers, and/or any number of IoT devices such as network-enabled appliances and infrastructure equipment. As shown in FIG. 1, resident devices 108 may be distributed at various locations throughout environment 104, and the electromagnetic signals emitted by resident devices 108 may be detected by the one or more antennas of device 102. As device 102 moves about different locations within environment 102, it may detect signals from different devices 108, and may detect those signals at different strengths; the identity and characteristics of those signals detected by device 102 may be used, as discussed below, to determine a location of device 102.

System 100 may further comprise a plurality of base station devices 106, which may be any suitable electronic devices configured to receive data transmitted from device 102 (or other such devices). Base station devices 106 may be configured to receive data, via electronic transmission, from a portable geolocation device, wherein the data received includes information about electromagnetic signals detected by the portable geolocation device. That is, device 102 may transmit information to one or more of bases station devices 106 regarding the electromagnetic signals emitted by resident electronic devices 108 and detected by device 102.

Following receipt of data transmitted from a portable geolocation device, one or more of base station devices 108 may be configured to transmit information, via electronic transmission, to one or more remote computing devices, such as remote system 112 in system 100. As explained in further detail below, the information transmitted to remote system 112 may be used by system 100 to determine a location of device 102 in environment 104.

In some embodiments, one or more of base station devices 108 may be a device configured to receive transmissions from device 102 via long-range communications at a low bit rate, such as by a LPWAN protocol. In some embodiments, one or more of base station devices 108 may be a LPWAN device configured to "listen" for LPWAN transmissions from portable geolocation devices. In some embodiments, one or more of base station devices 108 may be configured to execute outbound transmissions of data (e.g., transmissions of data to remote system 112) via Ethernet, Wi-Fi, and/or one or more other communication protocols supporting a higher bit-rate than the inbound LPWAN transmissions received by the device.

In some embodiments, one or more of base station devices 108 may be implemented in varying physical form-factors. For example, a base station device may be implemented in an outdoor form-factor (e.g., water-proof, weather-resilient, ruggedized, etc.) configured to be deployed, for example, on a rooftop of a building. Alternately, a base station device may be implemented in an indoor form-factor (e.g., not water-proof, not weather-resilient, not ruggedized, etc.) configured to be deployed, for example, inside a room or closet of a building. In some embodiments, base stations having different form factors may have one or more identical transmission receipt devices (e.g., LPWAN listening devices). In some embodiments, base stations having different form factors may have one or more identical outbound transmission devices (e.g., Wi-Fi or Ethernet devices). In some embodiments, a single environment (e.g., environment 104) may comprise different base stations having different form-factors and configured for use in the same geolocation system (e.g., system 100).

In some embodiments, remote system 112 may be any remote system or server which may communicate with other components of system 100 by electronic network communication. In some embodiments, remote system 112 may include one or more cloud-based systems, or may be provided in whole or in part by one or more cloud-based systems. Remote system 112 may be configured to execute one or more processes, as explained in further detail below, to receive information regarding geolocation of a mobile device, process the information received, and transmit information regarding geolocation of the device.

Remote system 112 also comprise one or more computer storage devices (e.g., databases) configured to store information regarding geolocation of devices in system 100, including instructions for performing geolocation methods as disclosed herein and/or data (e.g., configurations and/or settings for systems and/or devices, historical logs, etc.) regarding one or more geolocation systems such as system 100.

In some embodiments, a single system such as remote system 112 may be configured for simultaneous use in more than one system for indoor geolocation. Thus, while remote system 112 may be a part of system 100 as shown, the same remote system 112 may also be a part of other indoor geolocation systems for locating devices in other environments, and remote system 112 may function in a same or similar manner (as described in further detail herein) for those other systems as it does for system 100.

System 100 further comprises administrator device 114, which may be any one or more computing devices configured to be used by a system administrator to control one or more functionalities of system 100. In some embodiments, administrator device 114 may include a desktop computer, laptop computer, mobile electronic device, tablet, smartphone, workstation computer, or the like. In some embodiments, administrator device 114 may be configured to receive alerts and notifications generated by remote system 112 regarding geolocation of one or more devices in system 100. In some embodiments, administrator device 114 may be configured to accept inputs to control one or more settings and/or functionalities of system 100. In some embodiments, administrator device 114 may be configured to display and accept inputs via a graphical user interface, such as the graphical user interface discussed in additional detail below in FIGS. 6A-6K.

System 100 further comprises mapping device 110, which may be any mobile/portable electronic device configured to be movable about environment 104 in order to detect signals emitted by devices 108 and to transmit information regarding said signals to remote system 112 for development of a map of environment 104 with which device 102 may be located, by system 100, at a future time. For example, system administrators may move one or more mapping devices 110 about environment 104 in order to detect signals from devices 108 and gather information about the strength, location, and other characteristics of the different signals emitted by devices 108; this information may then be used to create a signal map of environment 104, such that information collected at a later time about signals detected by a geolocation device (e.g., device 102) may be compared to the signal map in order to determine a location of the device within environment 104.

In some embodiments, mapping device 110 may comprise one or more antennas configured to detect electromagnetic signals emitted by one or more resident devices 108 in environment 104. As mapping device 110 moves about different locations within environment 102, it may detect signals from different devices 108, and may detect those signals at different strengths; the identity and characteristics of those signals detected by device 102 may be used, as discussed below, to develop a signal map of environment 104.

In some embodiments, mapping device 110 may share one or more characteristics in common with geolocation device 102. For example, mapping device 110 and geolocation device 102 may have same or similar dimensions and configurations, may be fabricated from same or similar materials, and may comprise one or more same or similar antennas. In some embodiments, mapping device 110 and geolocation device 102 may be the same, including the same make and model. In some embodiments, one or more of the same devices may be used as both mapping device 110 and geolocation device 102. In some embodiments, devices having one or more of the same antennas may be used as mapping device 110 and geolocation device 102. In some embodiments, a device configured for use as geolocation device 102 may be used as mapping device 110. In some embodiments, a plurality of devices configured for use as a geolocation device (e.g., geolocation device 102) may be used as part of mapping device 110, including by using multiple geolocation devices as part of a single mapping device.

In some embodiments, system 100 comprises a plurality of mapping devices, of which mapping device 110 may be a single device, such that each of the multiple mapping devices may be movable throughout environment 104. In some embodiments, each of a plurality of mapping devices are identifiable by system 100, such as by a unique device identifier or other metadata. In this way, multiple mapping devices may be used for mapping within the same environment. This disclosure will refer to characteristics of mapping device 110, but those characteristics may be shared by one or more additional mapping devices that may be deployed in a multiple mapping-device environment. In some embodiments, operations performed at the mapping stage by mapping device 110 may capture and transmit a larger amount of data than is captured and/or transmitted during the geolocation stage; thus, mapping device 110 may, in some embodiments, be configured to transmit the data that it captures by one or more transmission protocols having a higher bandwidth than one or more transmission protocols used at the geolocation stage. For example, while data may be transmitted from device 102 using LPWAN at the geolocation stage, data may be transmitted from device 110 using Wi-Fi.

In some embodiments, the geolocation systems described herein may be provided as part of an indoor geolocation system usable in hotels, hospitals, apartment complexes, retirement homes, industrial buildings, commercial buildings, or any other multi-story indoor environment. Persons moving about inside the indoor environment may be outfitted with mobile devices to wear or carry on their person, or equipment moving about inside the indoor environment may be outfitted with mobile devices attached to the equipment, and the device may have one or more buttons that can be pressed to cause the device to initiate the process for determining a location of the device. In some embodiments, the devices may comprise two buttons that each need to be pressed simultaneously, such that false-positive alerts caused by pressing only a single button may be eliminated. (In some embodiments, rather than being triggered by a button press or other input, a device and/or system may be configured to automatically (e.g., periodically) determine a location of a mobile geolocation device.) In some embodiments, movement of the mobile geolocation device will be used as a trigger to determine a location of the mobile geolocation device.

Figure 2A:
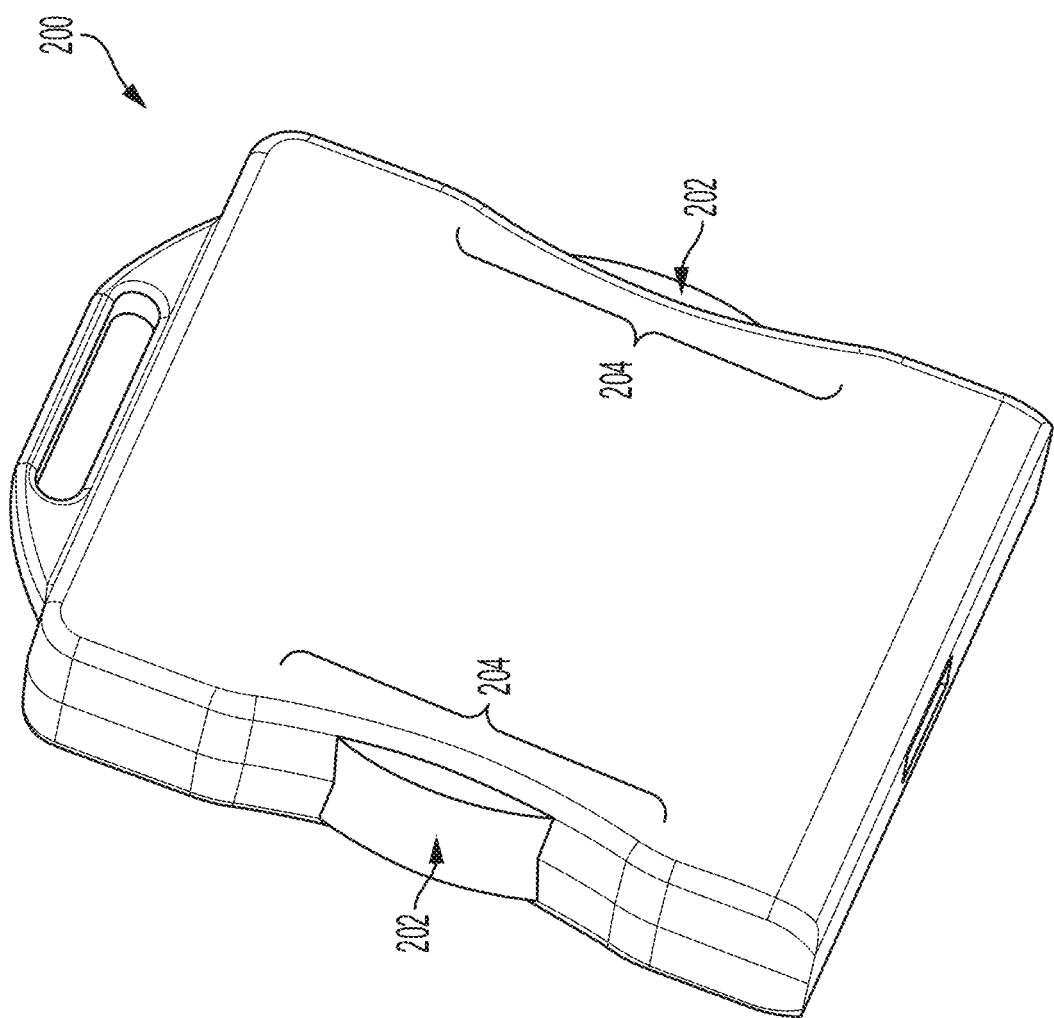
FIGS. 2A and 2B show a wearable geolocation device, in accordance with some embodiments.
Figure 2B:
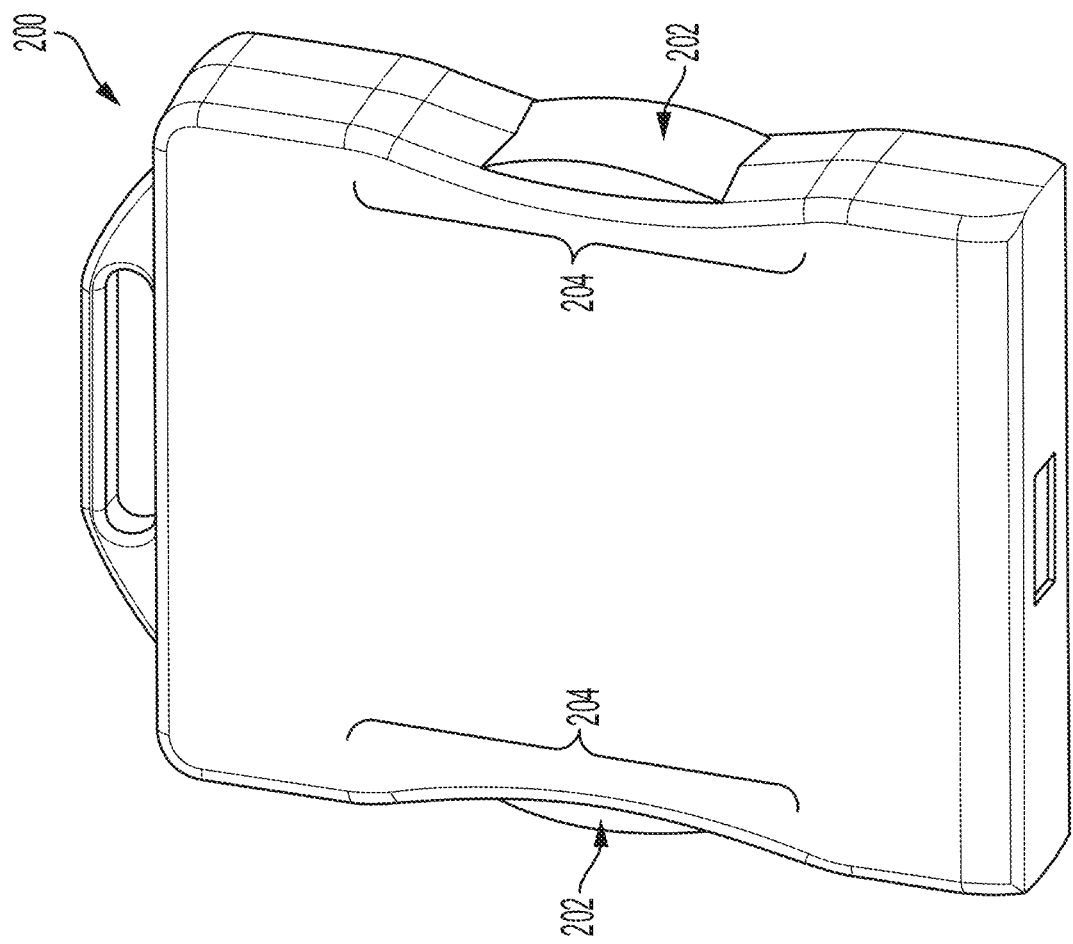

FIGS. 2A and 2B show a wearable geolocation device 200, in accordance with some embodiments. In some embodiments wearable geolocation device 200 may be used as geolocation device 102 in system 100, as described above.

As shown in FIGS. 2A and 2B, wearable geolocation device 200 may comprise buttons 202. In some embodiments, pressing one or more of buttons 202 may cause device 200 to execute one or more geolocation operations, including but not limited to detecting one or more signals from resident electronic devices (e.g., devices 108) by one or more antennas included in device 200, processing and/or filtering detected signals as discussed further below, and/or transmitting information regarding the signals detected to one or more other components of a geolocation system such as a base station (e.g., one or more of base station devices 106).

In some embodiments, device 200 may require that both buttons 202 are pressed simultaneously in order for device 202 to execute the one or more geolocation operations discussed herein. In some embodiments, device 200 may require that one or more buttons 202 are held in a pressed position for a predetermined amount of time (e.g., one second, two seconds, etc.) in order for device 202 to execute the one or more geolocation operations discussed herein. In some embodiments, requiring simultaneous actuation of multiple buttons and/or requiring that buttons be held down for a predetermined amount of time may prevent or mitigate accidental triggering of geolocation operations and may thereby prevent false-positive alerts (for example in personal safety geolocation systems).

In some embodiments, device 200 comprises one or more recesses 204 in which buttons 202 may be respectively positioned. In some embodiments, by positioning buttons within recesses such that the buttons do not protrude beyond an outermost protrusion of a body of device 200 (or such that the buttons protrude less dramatically beyond an outermost protrusion of a body of device 200), accidental button presses may be prevented or mitigated, as a user's hand or user's body or any other object that comes into contact with device 200 may be prevented from accidentally pressing one or more buttons by instead contacting a protrusion of the body of device 200.

In some embodiments, device 200 is shaped such that it has one or more broader faces and one or more narrower faces. In the example shown in FIGS. 2A and 2B, device 200 comprises broad, flat front and back faces, and buttons 202 are disposed on narrower side faces of device 200. In some embodiments, positioning one or more buttons on a narrower face of a geolocation device may prevent or mitigate accidental button presses, as the device may be more likely to be contacted on a broader face, for example if the device is being worn by a user and is hanging against a surface of the user's body.

FIGS. 3A and 3B show a wearable geolocation device 300, in accordance with some embodiments. In some embodiments wearable geolocation device 300 may be used as geolocation device 102 in system 100, as described above. In some embodiments, device 300 may share any one or more characteristics in common with device 200, as described above. In some embodiments, device 300 may differ from device 200 with respect to the shape of buttons 302 (disposed in recesses 304). Whereas buttons 202 of device 200 may be rectangular in shape, buttons 302 may be circular in shape.

Exemplary techniques and methods for use of geolocation systems and devices as disclosed herein will now be discussed.

As stated above, geolocation systems such as system 100 may, in some embodiments, operate in accordance with at least two stages: a mapping stage (which may also be called a calibration stage), and a geolocation stage. As discussed below, the calibration stage may be used to generate and store a model of an environment (e.g., environment 104) for geolocation, and the geolocation stage may then be used to determine a location of a specific geolocation device within the modeled/mapped environment.

In some embodiments, at the calibration/mapping stage, an indoor environment (e.g., environment 104) may be surveyed using a device (e.g., mapping device 110) comprising one or more antennas capable of detecting electromagnetic signals that are emitted by a plurality of devices native to the indoor environment (e.g., devices 108). In some embodiments, multiple scans of the same location may be performed. In some embodiments, rather than relying on specific signals from predetermined and/or dedicated geolocation beacons, the device used for the mapping may detect electromagnetic signals from Wi-Fi access points, Bluetooth devices, portable electronic devices such as phones and tablets, personal computers, and/or any number of IoT devices such as network-enabled appliances and infrastructure equipment. Using data regarding characteristics of the signals collected at various different physical locations in the indoor environment, a model (e.g., a signal map) of the indoor environment may be generated and stored, wherein the model (e.g., signal map) comprises information about the kinds of signals that can be expected to be detected (e.g., at future times during a geolocation stage of operation) at various different physical locations in the indoor environment.

In the example of FIG. 1, signals in environment 104 may be detected by mapping device 110. Data regarding some or all of the signals detected may be transmitted from device 110 to remote system 112, following optional processing, paring, and/or augmentation of the data collected by device 110. Remote system 112 may then process the data regarding some or all of the signals detected by device 110 in order to generate and store a model of environment 104. In some embodiments, the model of environment 104 may be stored, or example in a database included in or accessible by system 112, as a signal map of environment 104. The model of environment 104 may be stored in any suitable manner such that data regarding signals detected by a geolocation device (e.g., device 102) at a future time may be compared to the model in order to determine a location in the environment based on matching or otherwise corresponding data between the data collected by the geolocation device and the data represented in the model.

FIG. 4 shows a flow chart showing a method 400 for calibrating a geolocation system, in accordance with some embodiments. In some embodiments, method 400 may be performed by system 100 as discussed above with respect to FIG. 1.

At block 402, in some embodiments, the system detects, via a portable mapping device in an indoor environment, a plurality of electromagnetic signals. In the example of system 100, mapping device 110 may detect a plurality of electromagnetic signals emitted by devices 108. As discussed above, said signals may be detected from various Wi-Fi access points, Bluetooth devices, portable electronic devices such as phones and tablets, personal computers, and/or any number of IoT devices such as network-enabled appliances and infrastructure equipment. As discussed above, in some embodiments, said signals do not include signals emitted by dedicated devices or beacons such as base station devices 106.

As discussed elsewhere herein, signals may be collected from various different locations within environment 104, and more than one reading may in some embodiments be taken for a single location inside environment 104. In some embodiments, detecting an electromagnetic signal may comprise detecting a signal type, signal strength, signal band, signal frequency, and/or identity and/or type of a device/antenna generating the signal.

At block 404, in some embodiments, the system receives, from the mobile mapping device, data regarding the plurality of electromagnetic signals, including information regarding a plurality of locations at which the plurality of signals were captured. In some embodiments, this step may comprise the mobile mapping device transmitting data regarding some or all captured signals for additional processing (and for eventual use in development of the map of the indoor environment) by the system. For example, mapping device 110 may transmit (e.g., via wired or wireless electronic transmission) data regarding the electromagnetic signals to remote system 112. In some embodiments, mapping device 110 may be configured to transmit the data regarding the plurality of electromagnetic signals by one or more transmission protocols having a higher bandwidth than one or more transmission protocols used at the geolocation stage (see below). For example, while data may be transmitted from device 102 using LPWAN at the geolocation stage, data may be transmitted from device 110 at block 404 using Wi-Fi.

In some embodiments, information about a time of detection of a signal, location of detection of a signal, signal type, signal strength, signal band, signal frequency, identity and/or type of a device/antenna generating the signal, identity and/or type of a device/antenna that detected the signal, and/or any metadata regarding the signal or a device/antenna emitting the signal or a device/antenna detecting the signal may be transmitted from mapping device 110 to remote system 112 (or, in some embodiments, any one or more pieces of said information may be associated with one or more other pieces of said information by remote system 112 following transmission of the signal from mapping device 110).

In some embodiments, the system may filter the data regarding the plurality of electromagnetic signals, for example to remove unreliable and/or transient signals and to focus on only the most reliable signals. This may be done, for example, by using a predefined whitelist of the most reliable and/or useful signals in order to select all whitelisted signals, or to select a predefined number of the most-preferred whitelisted signals detected by the device. In some embodiments, only certain types of signals may be selected, while other types of signals (e.g., those associated with devices expected to be transient, unreliable, or frequently moved about) may be removed from the pool of signals. In this way, the system may use electromagnetic signals that are present in an indoor environment due to preexisting electronic devices, but may filter out signals from equipment that may not be expected to be reliable for mapping and/or geolocation purposes, such as mobile phones and wearable devices that are highly likely to be frequently moved and/or to have not been present at all during the mapping stage. In some embodiments, the system may filter the signals based in whole or in part on signal strength. For example, stronger signals may be selected while weaker signals may be discarded. In some embodiments, only signals having a strength above a predefined threshold may be selected. In some embodiments, signals may have to be whitelisted and also meet signal strength requirements in order to be selected (e.g., to not be discarded). In some embodiments, filtering of the signals may be done by a remote system or server (e.g., system 112). In some embodiments, filtering of the signals may be done before and/or after transmitting signal data from the mapping device (e.g., device 110). Once the system has filtered the detected signals, the filtered signals may then be used to generate a model of the environment, as discussed below.

At block 406, in some embodiments, the system generates and stores a model of the environment based on the plurality of electromagnetic signals. In some embodiments, the model may be generated and stored in the form of a signal map. In the example of system 100, the model may be generated by remote system 112, and may be stored at or by remote system 112 in any suitable database or other computer storage.

In some embodiments, characteristics of the signals that are detected and used to generate the model (e.g., signal map) may include time of detection of a signal, location of detection of a signal, signal type, signal strength, signal band, signal frequency, identity and/or type of a device/antenna generating the signal, identity and/or type of a device/antenna that detected the signal, and/or any metadata regarding the signal or a device/antenna emitting the signal or a device/antenna detecting the signal. In some embodiments, the model (e.g., signal map) may be based on one or more signal profiles (discussed further below) generated based on one or more characteristics of the signals detected.

In some embodiments, the model may be stored for future reference during a geolocation operation (e.g., method 500 below). In some embodiments, all or part of the model may be transmitted to one or more other computer devices, for example administrator device 114, for use by one or more users of the system.

At block 408, in some embodiments, generating and storing the model of the environment comprises accounting for variation amongst a plurality of data points for a single location. In some embodiments, during the calibration/mapping stage, multiple scans of the same location may be performed, and variations of detected signal characteristics across multiple scans of the same location may be used to determine expected and/or standard deviations that may be expected from a signal, and these expected and/or standard deviations may be accounted for in the model (e.g., signal map). For example, if a signal is observed in a plurality of locations, the signal may be treated differently in the model than a localized signal.

At block 410, in some embodiments, generating and storing the model of the environment comprises applying a respective adjustment to one or more of the plurality of signals to generate one or more respective adjusted signals.

In some embodiments, the signals captured at the calibration/mapping stage may be captured in a same or similar manner as the capture of signals at the geolocation stage (explained below), including by using one or more antennas having one or more same or similar characteristics as antenna used at the geolocation stage. For example, antennas used at the calibration/mapping stage and at the geolocation stage may have same or similar dimensions and configurations, may be fabricated from same or similar materials, and may be provided in same or similar devices. In some embodiments, antennas used at the calibration/mapping stage and at the geolocation stage may be the same, including the same make and model. In some embodiments, one or more of the same antennas may be used at both stages. In some embodiments, one or more of the same devices may be used at both stages. In some embodiments, a device configured for use in the geolocation stage may be used at the calibration/mapping stage. In some embodiments, a plurality of devices configured for use in the geolocation stage may be used at the calibration/mapping stage.

In some embodiments, when different devices and/or antennas are used during the calibration/mapping stage and the geolocation stage (as discussed further below), one or more adjustments or modifications to the data captured at one or both stages may be applied to account for the differences between the different antennas. For example, data from previous usages of one or both devices/antennas may be used to apply a correction or adjustment to the data captured by an antenna during the calibration/mapping stage and/or to the data captured by an antenna during the geolocation stage, such that the corrected/adjusted data can be expected to more closely mimic the data captured by the other antenna at the other stage. In some embodiments, applying adjustments in this manner may address the issue of different antennas reading signals at different strengths.

Following execution of the mapping/calibration stage, once a model of the environment has been created and stored, the system may then perform geolocation operations to determine a location in three-dimensional space of a geolocation device in the environment that has been modeled. In some embodiments, a geolocation device may detect signals from one or more resident electronic devices in the three-dimensional environment that was modeled at the mapping/calibration stage, may optionally filter the detected signals (for example to generate a signal profile based on the detected signals), and may transmit data regarding some or all of the detected signals (e.g., the signal profile) to one or more base station devices positioned in the three-dimensional environment. Data may then responsively be transmitted from the one or more base station devices to a remote system, where the data may be compared to the model of the environment in order to determine a location in three-dimensional space of the geolocation device. Once a location in three-dimensional space of the geolocation device is determined, one or more alerts regarding the determined location may be generated, transmitted, and/or displayed.

In the example of FIG. 1, signals from devices 108 in environment 104 may be detected by geolocation device 102. Data regarding some or all of the signals detected may be transmitted from device 102 to one or more of base stations 106, following optional processing, paring, and/or augmentation by device 102 of the data collected. In some embodiments, processing the data may generate a signal profile to be transmitted from device 102. Optionally following further processing, paring, and/or augmentation of the data by one or more of base stations 106, the data may then be transmitted from one or more of base stations 106 to remote system 112. Remote system 112 may then process the data regarding some or all of the signals detected by device 102 in order to generate and store a model of environment 104. In some embodiments, the model of environment 104 may be stored, or example in a database included in or accessible by system 112, as a signal map of environment 104. The model of environment 104 may be stored in any suitable manner such that data regarding signals detected by a geolocation device (e.g., device 102) at a future time may be compared to the model in order to determine a location in the environment based on matching or otherwise corresponding data between the data collected by the geolocation device and the data represented in the model.

FIG. 5 shows a flow chart showing a method for determining a location of a portable electronic device using a geolocation system, in accordance with some embodiments. In some embodiments, method 500 may be performed by system 100 as discussed above with respect to FIG. 1.

At block 502, in some embodiments, the system detects, at a mobile geolocation device in an indoor environment, an input comprising an instruction to determine a location of the mobile geolocation device in three-dimensional space. In some embodiments, the mobile geolocation device may be any device movable throughout an environment of a geolocation system (e.g., an indoor environment) and configured to detect one or more electromagnetic signals for use in geolocation the device. As discussed elsewhere herein, the mobile geolocation device may in some embodiment be a wearable device carried by a person throughout an indoor environment such as a hotel or hospital. In the example of system 100 in FIG. 1, the mobile geolocation device may be geolocation device 102 may be located in environment 104.

In some embodiments, the mobile geolocation device may detect an input comprising actuation of one or more buttons on the device. For example, one or more of buttons 202 on device 200 may be pressed and/or held, or one or more of buttons 302 on device 300 may be pressed and/or held. In some embodiments, the device may detect an input by any other suitable means, such as pressing one or more buttons or keys, voice activation, and/or receiving a remote signal indicating an input. In some embodiments, the system may be configured to provide said input automatically (e.g., intermittently, at predetermined times, at predetermined time intervals, upon movement of the device, or in response to one or more predetermined trigger conditions), such that geolocation may be performed without manual human intervention.

At block 504, in some embodiments, the system detects, by the mobile geolocation device in the indoor environment, a plurality of electromagnetic signals. (It should be noted that this "plurality of electromagnetic signals" is distinct from the "plurality of electromagnetic signals" detected during the mapping/calibration stage, though the two pluralities of signals detected may share one or more characteristics with one another, including by including signals emitted from same or similar devices in the indoor environment.) The detection of these electromagnetic signals may, in some embodiments, be performed responsively to the input received at block 502.

For example, in some embodiments, upon a button on the mobile device being pressed (or upon an input being otherwise indicated), the mobile device may take a reading, using one or more antennas included in the mobile device, of electromagnetic signals that can be detected from its current location. As with the calibration/mapping stage, these electronic signals are, in some embodiments, not detected from predetermined and/or dedicated beacons (e.g., base station devices 106), but instead are detected from one or more of the same Wi-Fi access points, Bluetooth devices, portable electronic devices such as phones and tablets, personal computers, and/or IoT devices that were detected at the calibration/mapping stage. In the example of system 100, device 102 detects electromagnetic signals emitted by resident devices 108.

At block 506, in some embodiments, the system generates, by the mobile geolocation device, a signal profile based on the plurality of electromagnetic signals. In some embodiments, the signal profile may be configured to be transmitted from the mobile geolocation device and compared to stored data for efficient and accurate determination of a location of the mobile geolocation device. In some embodiments, a data profile may be configured to have a sufficiently compact data size for fast, efficient, low-bandwidth, and/or reliable transmission from the mobile geolocation device.

In some embodiments, generating the signal profile may comprise performing data processing, data paring, and/or data augmentation to data regarding some or all of the detected signals. In some embodiments, the signal profile may comprise data regarding the detected signals. In some embodiments, the signal profile may comprise data regarding a subset of the detected signals (e.g., as distinct from data regarding all of the detected signals).

At block 508, in some embodiments, generating the signal profile comprises comparing the plurality of electromagnetic signals to a predefined list of electromagnetic signals to select a subset of the plurality of electromagnetic signals based on the predefined list.

In some embodiments, from the detected signals, the mobile device (e.g., device 102) may filter out a subset of the signals, for example to remove unreliable and/or transient signals and to focus on only the most reliable signals. This may be done, for example, by using a predefined whitelist of the most reliable and/or useful signals in order to select all whitelisted signals, or to select a predefined number of the most-preferred whitelisted signals detected by the device. In some embodiments, only certain types of signals may be selected, while other types of signals (e.g., those associated with devices expected to be transient, unreliable, or frequently moved about) may be removed from the pool of signals. In this way, the system may use electromagnetic signals that are present in an indoor environment due to preexisting electronic devices, but may filter out signals from equipment that may not be expected to be reliable for geolocation purposes, such as mobile phones and wearable devices that are highly likely to be frequently moved and/or to have not been present at all during the mapping stage. In some embodiments, the system may select a subset of signals based in whole or in part on signal strength. For example, stronger signals may be selected while weaker signals may be discarded. In some embodiments, only signals having a strength above a predefined threshold may be selected. In some embodiments, signals may have to be whitelisted and also meet signal strength requirements in order to be selected for the subset of signals. Once the mobile device has selected a subset of the detected signals the device may transmit data regarding those selected signals (e.g., in the form of the signal profile referred to at block 506) such that the signals may be used to locate the mobile device in three-dimensional space in the indoor environment.

In some embodiments, filtering detected signal to a subset of the signals and/or generation of a signal profile may be performed by a component of the geolocation system other than the mobile geolocation device. However, in some embodiments, performing filtering and/or generation of a signal profile at the mobile geolocation device itself may be advantageous because it may minimize the amount of data that is transmitted from the mobile geolocation device, thereby increasing speed, efficiency, and reliability of data transmissions.

At block 510, in some embodiments, the system transmits, via a transmission device of the mobile geolocation device, the signal profile to one or more base stations. In the example of system 100, the one or more base stations may be one or more of base station devices 106.

In some embodiments, the transmission may be performed via a wireless transmission device of the mobile geolocation device, such as a wireless transmitted configured to send one or more messages via Wi-Fi, Bluetooth, and/or LPWAN transmission. In some embodiments, transmitting data from the mobile geolocation device to a LPWAN-enabled base station using an LPWAN transmission may improve reliability of the transmission and decrease bandwidth and energy requirements. In some embodiments, using LPWAN transmissions may obviate the need for unreliable and/or cumbersome pairing operations that may be required for Wi-Fi data transmissions.

In some embodiment, the base stations/antennas (e.g., LPWAN base stations/antennas, base station devices 106) may be positioned in or around the indoor environment such that the mobile device may transmit the data regarding the selected signals to one or more of the base stations/antennas, and the one or more base stations/antennas may thereafter optionally transmit that data (and/or related data) to a server or processor, on or off of the premises, configured to determine a location of the mobile device. Base stations/antennas may be positioned in and/or about the indoor environment such that coverage of the indoor environment is completely redundant; that is, the base stations/antennas may be positioned such that no location in the indoor environment will experience a coverage failure due to the failure of a single base station/antenna.

In some embodiments, other data regarding the detected signals, alternately or in addition to the signal profile, may be transmitted from the mobile geolocation device.

At block 512, in some embodiments, the system transmits the signal profile from the one or more base stations to a remote server. In the example of system 100, data may be transferred from one or more of base station devices 106 to remote system 112.

In some embodiments, data may be transmitted from any one or more base station devices to one or more on- or off-site servers, processors, or systems for additional processing, such as for comparison of a signal profile to a model of the environment to determine a location of the mobile geolocation device. In some embodiments, transmission of data from the one or more base stations may be executed by any wired or wireless network communication protocol, including but not limited to Ethernet transmission and/or Wi-Fi transmission.

In some embodiments, all data received from a mobile geolocation device by a base station device may be re-transmitted by the base station device; in some embodiments, only some of the data received from a mobile geolocation device by a base station device may be retransmitted by the base station device; in some embodiments, modified and/or additional data received from a mobile geolocation device by a base station device may be transmitted by the base station device.

In some embodiments, transmission of data by the base station device may be performed automatically in response to detecting and receiving the transmission from the mobile geolocation device.

At block 514, in some embodiments, the system determines, based on a comparison of the signal profile to stored data regarding signal profiles at a plurality of locations in the indoor environment, a location in three-dimensional space of the mobile geolocation device. In some embodiments, this determination may be performed by a remote server, processor, or system to which data is transferred from the base station(s). In the example of system 100, this determination may be performed by one or more processors of remote system 112.

In some embodiments, the stored data regarding signal profiles at a plurality of locations in the indoor environment may comprise, or may be provided in the form of, a model of the indoor environment and/or a signal map such as those discussed above with respect to the calibration/mapping stage and method 400. In some embodiments, once in receipt of the data regarding the selected signals, the server or processor may determine the location in three-dimensional space of the mobile electronic device by comparing the data regarding the selected signals to the signal map generated at the calibration/mapping stage. In some embodiments, the system may apply one or more matching algorithms to determine which one or more of the mapped locations most closely match the data received about the selected signals that were detected by the mobile device. The system may then determine that the mobile device is located in three-dimensional space at or near one or more of the locations indicated in the signal map as the closest match(es) to the data regarding the selected signals detected by the mobile device.

At block 516, in some embodiments, the system generates and displays an alert or location data regarding the present or last determined location of the mobile geolocation device. In some embodiments, upon determining a location in three-dimensional space for the mobile device, the system may generate one or more alerts regarding the location of the mobile device, including displaying information about the determined location on a textual or graphical user interface, transmitting information about the determined location to one or more other computing or telecommunication devices, and/or storing information about the determined location.

In the example of system 100, upon determining a location of device 102, remote system 112 may transmit information regarding the determined location to administrator device 114. In some embodiments, the remote system 112 can continue to transmit location data until an alert is resolved. In some embodiments, the remote system 112 can provide Real Time Location Services (RTLS) as the device 102 is moving, a Last Known Location message once device 102 has stopped moving, and/or the remote system 112 may provide periodic location notices (time based). The information transmitted to administrator device 114 may cause administrator device 114 to display or otherwise output information regarding the determined location, such that a system administrator may be made aware of the determined location and any associated information.

In some embodiments of indoor geolocation systems such as those described herein, mobile geolocation devices may be configured to send intermittent diagnostic signals to one or more other components of the system, including information regarding their location, health, usage history, battery level (e.g. remaining battery life), and the like. In some embodiments, diagnostic signals may be sent at a predetermined time, after a predetermined period of time has passed since a last usage or a last diagnostic message, when a device is in a predetermined location, when a device detects a malfunction or other predetermined trigger event, and/or when a device is at or below a predetermined battery level.

In some embodiments, indoor geolocation systems such as those described herein may comprise a textual and/or graphical user interface (hereafter simply referred to as a GUI) accessible by workstation, computer, laptop, tablet, and/or mobile phone. In the example of system 100, a GUI may be displayed by administrator device 114, such that a user of administrator device 114 may view information about environment 104, device 102 (and other mobile geolocation devices in the environment), and system 100 generally. In some embodiments, the GUI may provide visual alerts, audible alerts, and/or alerts transmitted to one or more remote electronic devices (such as alerts transmitted by text message and/or email). In some embodiments, the GUI may display information regarding devices that have been triggered (e.g., devices on which a button has been pressed) and/or devices that have not contacted the system for a diagnostic check-in for greater than a predefined threshold period of time. In some embodiment, the GUI displayed by administrator device 114 may also enable a user of administrator device 114 to execute inputs to control one or more functionalities of system 100. In some embodiments, the GUI may include a virtual dashboard interface for viewing information about system 100 and/or executing commands to control system 100.

FIGS. 6A-6K show various screens of a graphical user interface (GUI) for an indoor geolocation system, in accordance with some embodiments. In the embodiments shown in FIGS. 6A-6K, the screens of the GUI are configured for display and use by a desktop or laptop device, including by clicking on various selectable icons in order to access GUI functionality. However, same or similar screens and/or functionalities may be displayed and/or used by touch-screen devices, such as tablet devices and/or smart phone devices, and the various selectable icons shown may in some embodiments be selected by tapping on the icons on a touch-screen device. In the example of system 100, the screens of FIGS. 6A-6K may be displayed by administrator device 114 and used to display information about and control functionality of system 100.

Figure 6A:
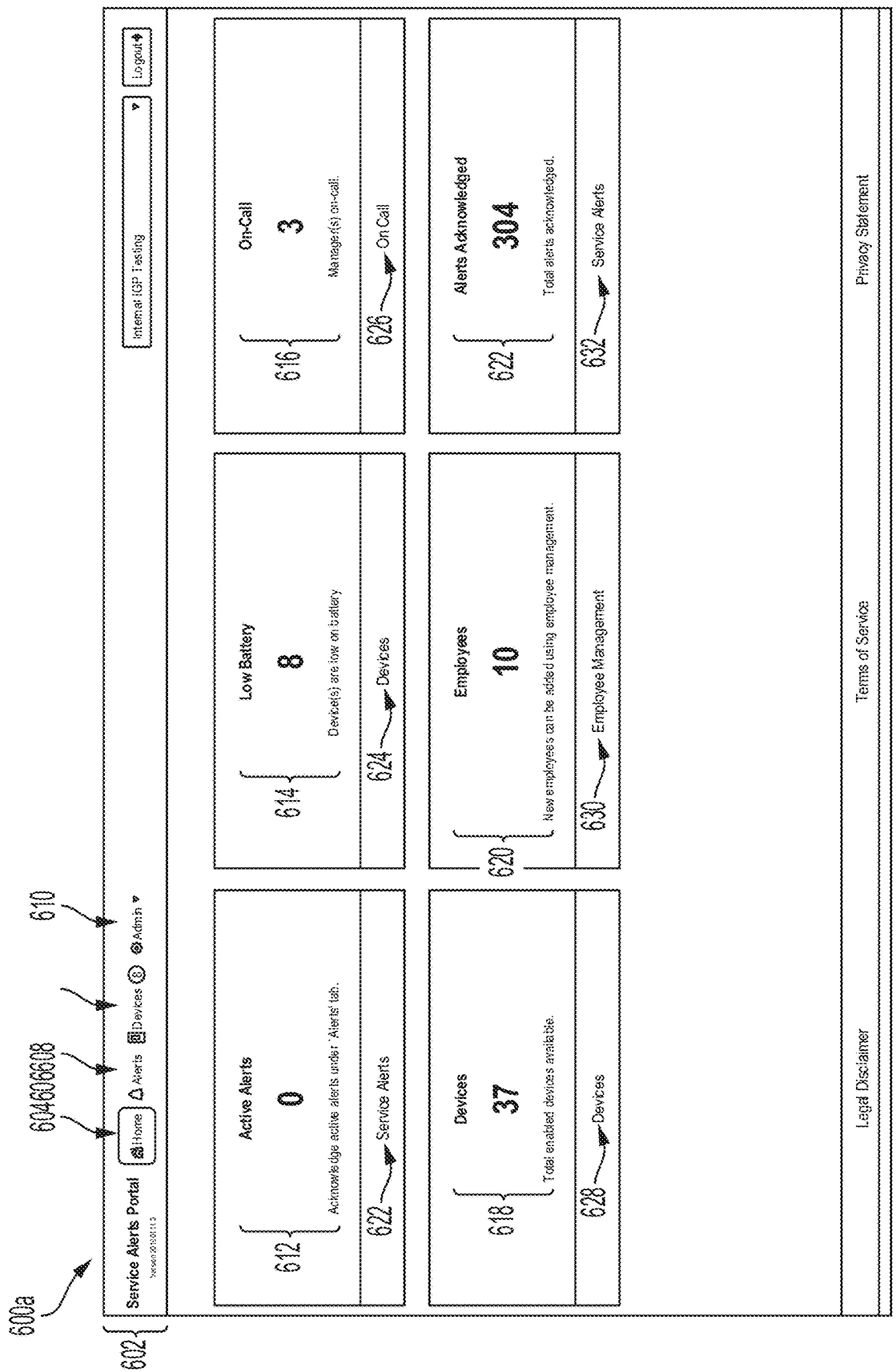
Figure 7:
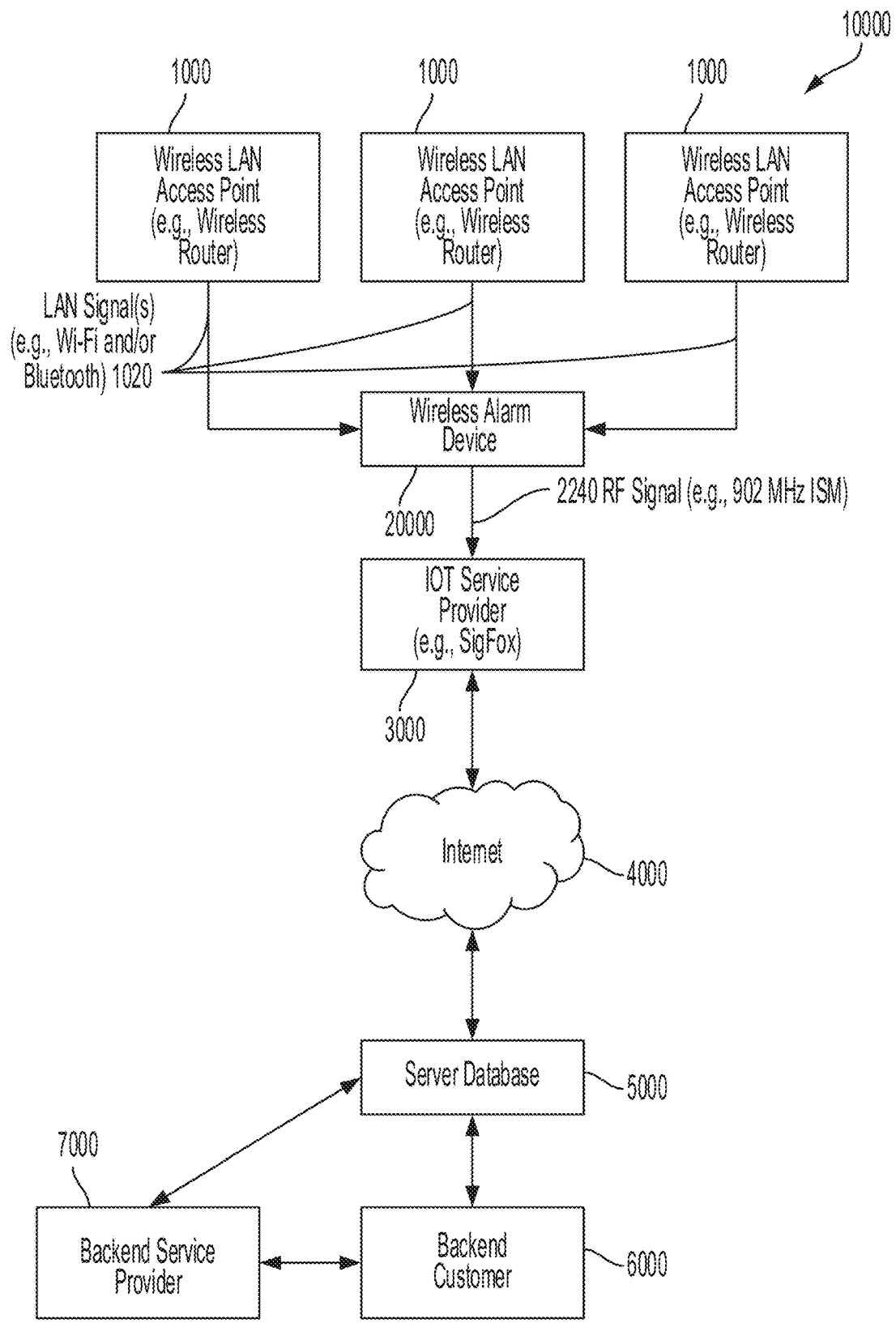
FIG. 7 shows a wireless communication system, in accordance with some embodiments.

FIG. 6A shows screen 600*a*, which is a home screen, in accordance with some embodiments. In some embodiments, a home screen such as screen 600*a* may be a landing page for a GUI for managing a property on which an indoor geolocation system, such as those discussed herein, is deployed. Home screens such as As shown, screen 600*a* comprises toolbar 602 with various selectable icons: home icon 604, alerts icon 606, devices icon 608, and admin icon 610. One or more of the selectable icons of toolbar 602 may be selected (e.g., clicked or tapped) to navigate to other screens of the GUI. In some embodiments, one or more of the selectable icons may show notification data, such as devices icon 608 displaying a number "8" to indicate that eight geolocation devices in the system are currently in a low-battery state.

As shown, screen 600*a* further comprises notification areas 612-622, which display information regarding the managed system (e.g., system 100). Notification area 612 indicates a number of active alerts ("0"), notification area 614 indicates a number of geolocation devices in the system with low batteries ("8"), notification area 616 indicates a number of managers on-call at a property (e.g., hotel, hospital, etc.) associated with the system ("3"), notification area 618 indicates a number of geolocation devices in the system ("37"), notification area 620 indicates a number of employees registered for the property associated with the system ("10"), and notification area indicates a number of acknowledged alerts ("304").

Each of the notification areas 612-622 is also associated with a respective corresponding selectable icon 622-632: service alerts icons 622 and 632, either of which may be selected to navigate to a screen displaying alerts; devices icons 624 and 628, either of which may be selected to navigate to a screen displaying information regarding devices; on-call icon 626, which may be selected to navigate to a screen displaying information regarding on-call employees, and employee management icon 630, which may be selected to navigate to a screen for employee management.

Figure 6B:
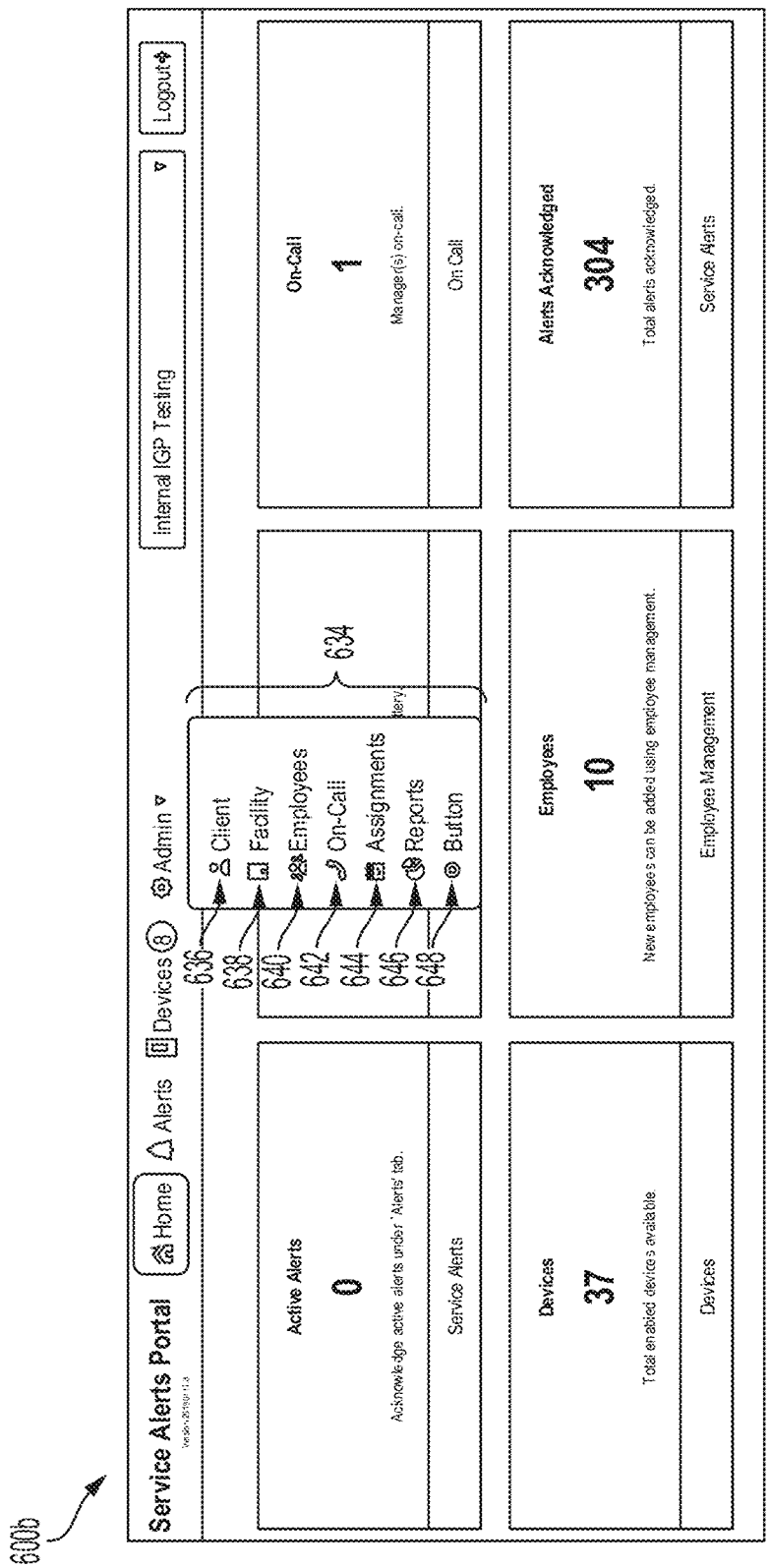

FIG. 6B shows screen 600*b*, which shows the home screen of screen 600*a* with a drop-down menu 634 expanded, in accordance with some embodiments. In some embodiments, upon selecting admin icon 610, drop-down menu 634 may be displayed. As shown, drop-down menu 634 may comprise a plurality of selectable icons 636-648: client icon 636, which may be selected to navigate to a screen displaying information regarding clients associated with the system; facility icon 638, which may be selected to navigate to a screen displaying information regarding a facility or property (e.g., hotel, hospital, etc.) associated with the system; employees icon 640, which may be selected to navigate to a screen displaying information regarding employees registered to the system; on-call icon 642, which may be selected to navigate to a screen displaying information regarding on-call employees; assignments icon 644, which may be selected to navigate to a screen for assigning geolocation devices to persons; reports icon 646, which may be selected to navigate to a screen displaying information regarding reports; and button icon 648, which may be selected to navigate to a screen displaying information regarding one or more geolocation devices (e.g., "buttons") in the system.

FIG. 6C shows screen 600*c*, which is an alerts screen, in accordance with some embodiments. In some embodiments, screen 600*c* may be accessed by selecting either of alerts icons 606, 622, or 632 at screen 600*a*. Screen 600*c* may display active notifications/alerts, including information such as a name of a user assigned to an alerting geolocation device, a unique ID and/or name for the alerting device, a location where the device was activated, a number of times a button of the device was pressed, and/or a time the alert event was recorded.

In the example of FIG. 6C, screen 600*c* shows four active alerts 650*a*-650*c*, each of which shows respective information in columns indicating a name of an alerting geolocation device and/or associated employee, a photograph of an employee associated with the alerting device, an identifier of the alerting device, a location (e.g., a location in three-dimensional space in an indoor environment as determined by one or more of the systems and/or methods disclosed herein) of the alerting device, a date and/or time at which the alert was received and/or at which a button of the alerting device was pressed, and a number of times the a button of the alerting device was pressed.

Screen 600*c* further comprises four selectable acknowledge icons 652*a*-652*d*, associated respectively with the four active alerts 650*a*-650*d*. By selecting an acknowledge icon, a user of the GUI may indicate that an alert has been acknowledged, thereby removing it from the list of active alerts.

Figure 6D:
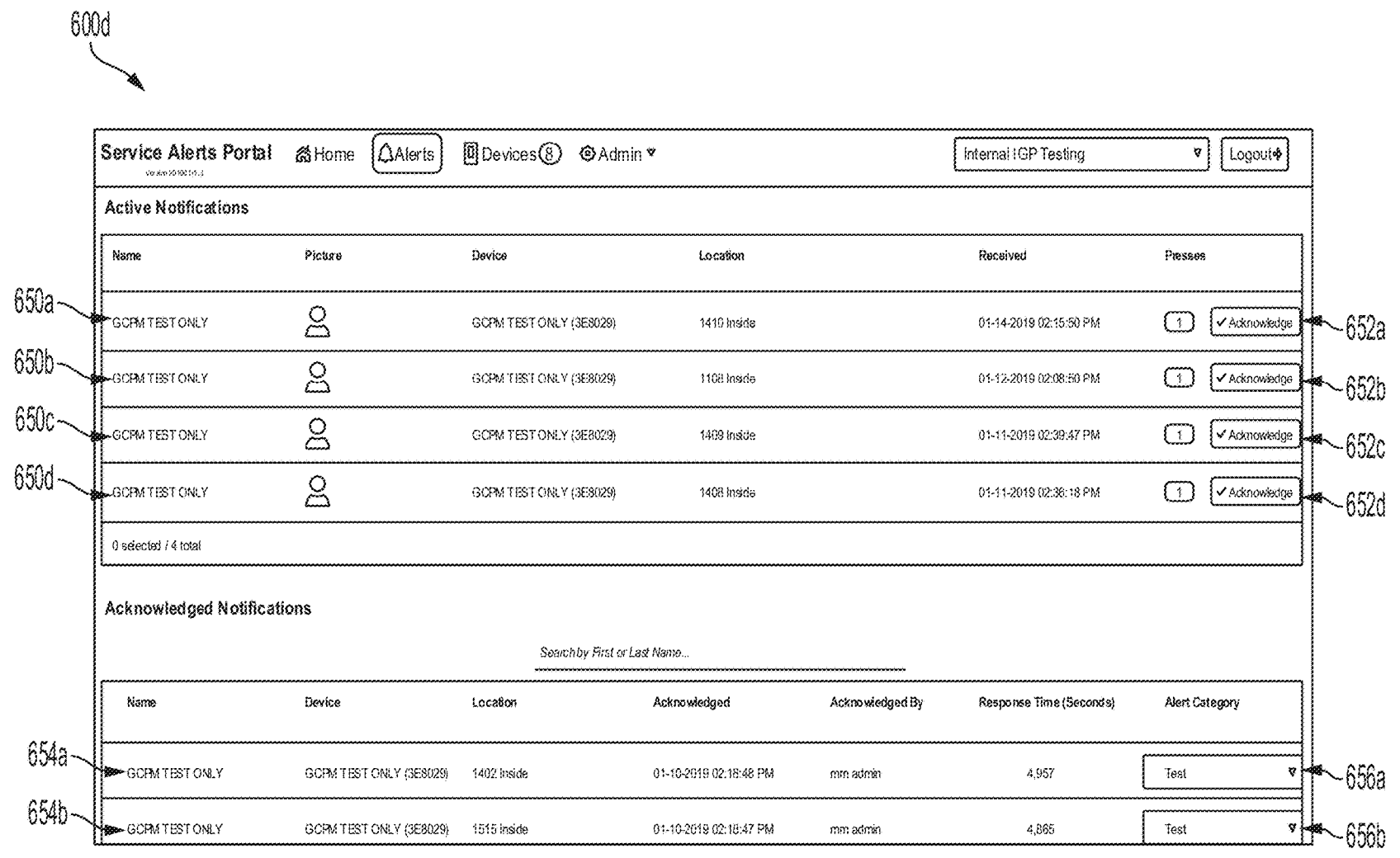

FIG. 6D shows screen 600*d*, which is an alerts screen showing active alerts and acknowledged alerts, in accordance with some embodiments. Screen 600*d* may share any one or more characteristics in common with screen 600*c*, and it may also display acknowledged notifications/alerts, including information such as a name of a user assigned to an alerting geolocation device, a unique ID and/or name for the alerting device, a location where the device was activated, a number of times a button of the device was pressed, a time the alert event was recorded, a time the alert was acknowledged, and a response time (e.g., time between the alert being created and being acknowledged).

In the example of FIG. 6D, screen 600*d* shows two acknowledged alerts 650*a*-650*c*, each of which shows respective information in columns indicating a name of an alerting geolocation device and/or associated employee, an identifier of the alerting device, a location (e.g., a location in three-dimensional space in an indoor environment as determined by one or more of the systems and/or methods disclosed herein) of the alerting device, a date and/or time at which the alert was marked as acknowledged, a name of a user who marked the alert as acknowledged, a response time within which the alert was marked as acknowledged, and an alert category for the alert.

In some embodiments, the alert category column may comprise a selectable drop-down menu 656*a* or 656*b*, which a user may select (e.g., click or tap) in order to indicate a category by which the alert should be classified. In some embodiments, categories by which alerts may be classified may include "alarm," "inadvertent alarm," "test" "other," and/or "uncategorized."

Figure 6E:
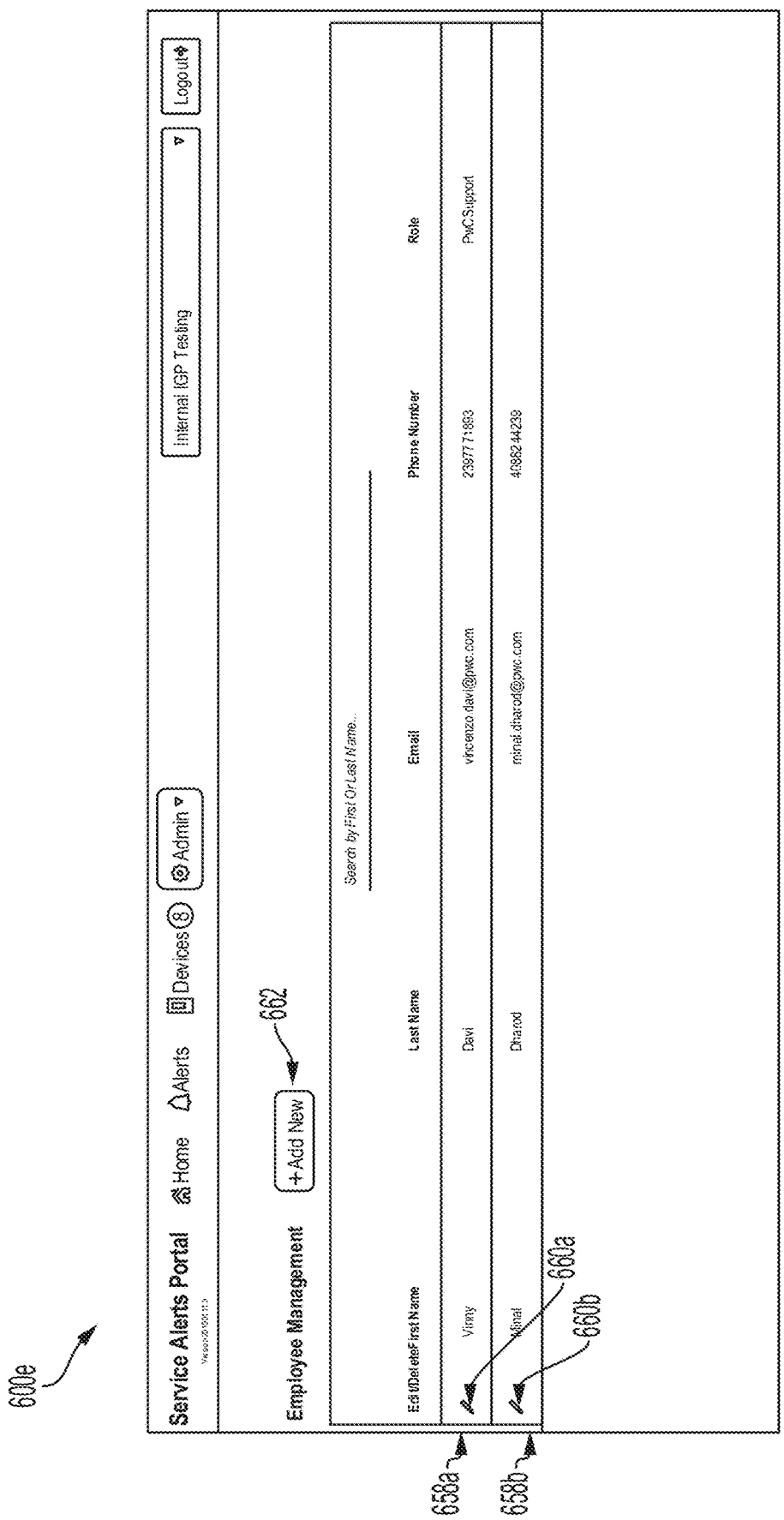

FIG. 6E shows screen 600*e*, which is an employee management screen, in accordance with some embodiments. In some embodiments, screen 600*e* may be accessed by selecting either one of employee management icon 620 at screen 600*a* or employees icon 640 at screen 600*b*. Screen 600*e* may display information about employees registered to the system, who may be employees who work at a facility associated with the system and/or who are assigned to carry mobile geolocation devices within a monitored environment of the system. In some embodiments, screen 600*e* may provide access to GUI functionality for adding/editing/deleting employees from the system, uploading pictures for employees, and/or managing "on-call" and "device assignment eligible" designations for one or more employees.

In the example of FIG. 6E, screen 600*e* shows two employee entries 658*a* and 658*b*, each of which shows respective information in columns indicating a first name for the employee, a last name for the employee, an email address for the employee, a phone number for the employee, and a role for the employee. Screen 600*c* further comprises selectable edit/delete icons 660*a* and 660*b*, associated respectively with employee entries 658*a* and 658*b*, which may be selected by a user to access one or more GUI screens for editing employee information and/or deleting an employee entry. Screen 600*c* further comprises selectable new employee icon 662, which may be selected by a user to access one or more GUI screens for adding a new employee.

Figure 6F:
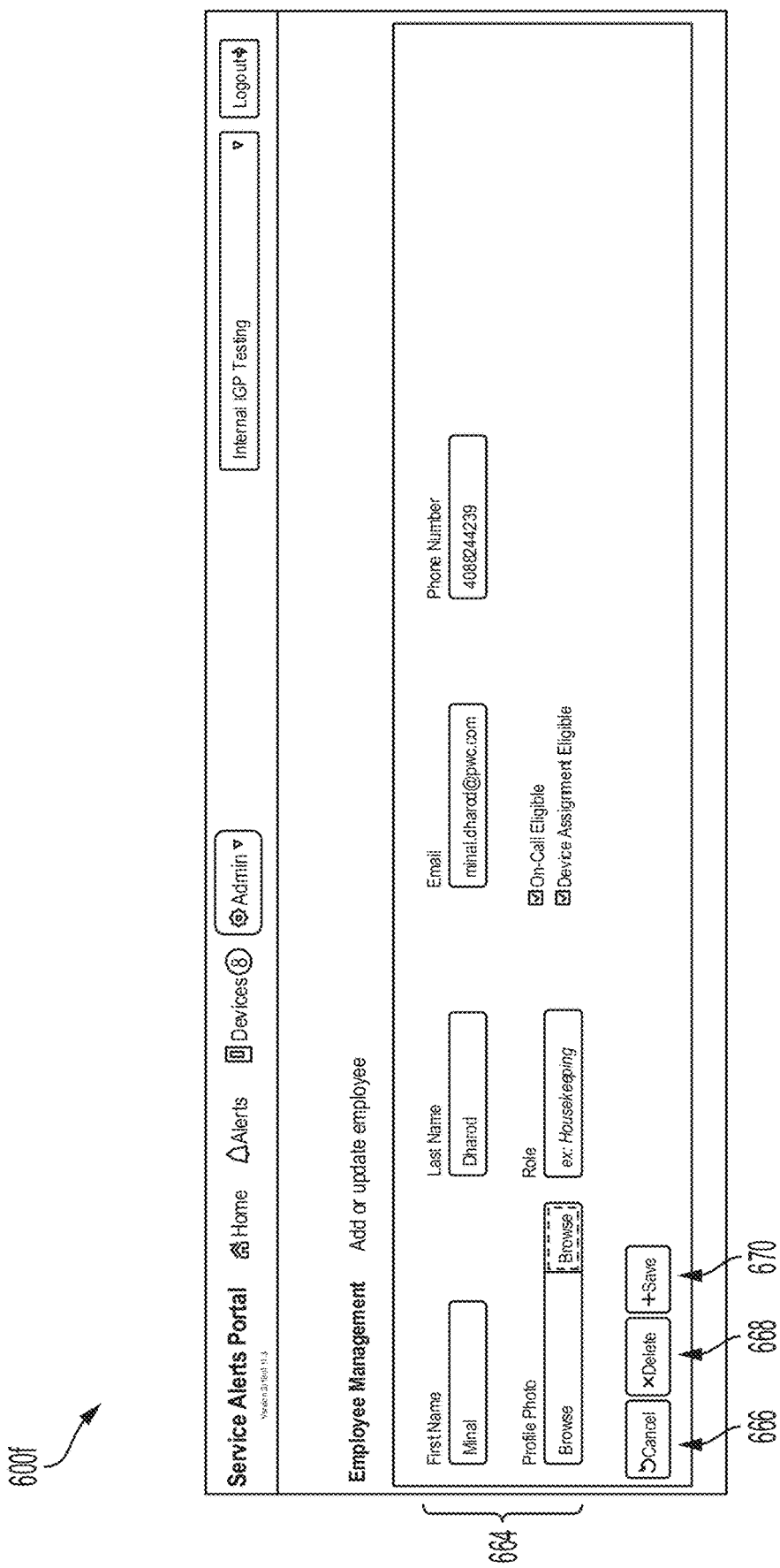

FIG. 6F shows screen 600f, which is a screen for adding an employee entry and/or editing employee information for an existing employee entry, in accordance with some embodiments. In some embodiments, screen 600f may be accessed by selecting any one of edit/delete icons 660a and 660b or new employee icon 662 at screen 600e.

Screen 600f comprises employee information entry interface 664, which may comprise one or more fields and/or selectable options for indicating employee information. In the example shown, employee information entry interface 664 comprises fields for entering an employee first name, an employee last name, an employee email address, an employee photo, and an employee role. In the example shown, employee information entry interface 664 further comprises selectable options (in the form of check-boxes) for designating whether an employee is on call and/or eligible for assignment to a mobile geolocation device.

Screen 600f further comprises cancel button 666, which may be selected to cancel the operation for modifying or adding an employee entry; delete button 668, which may be selected to delete the corresponding employee entry; and save button 670, which may be selected to save information entered into employee information entry interface 664 to the corresponding employee entry.

Figure 6G:
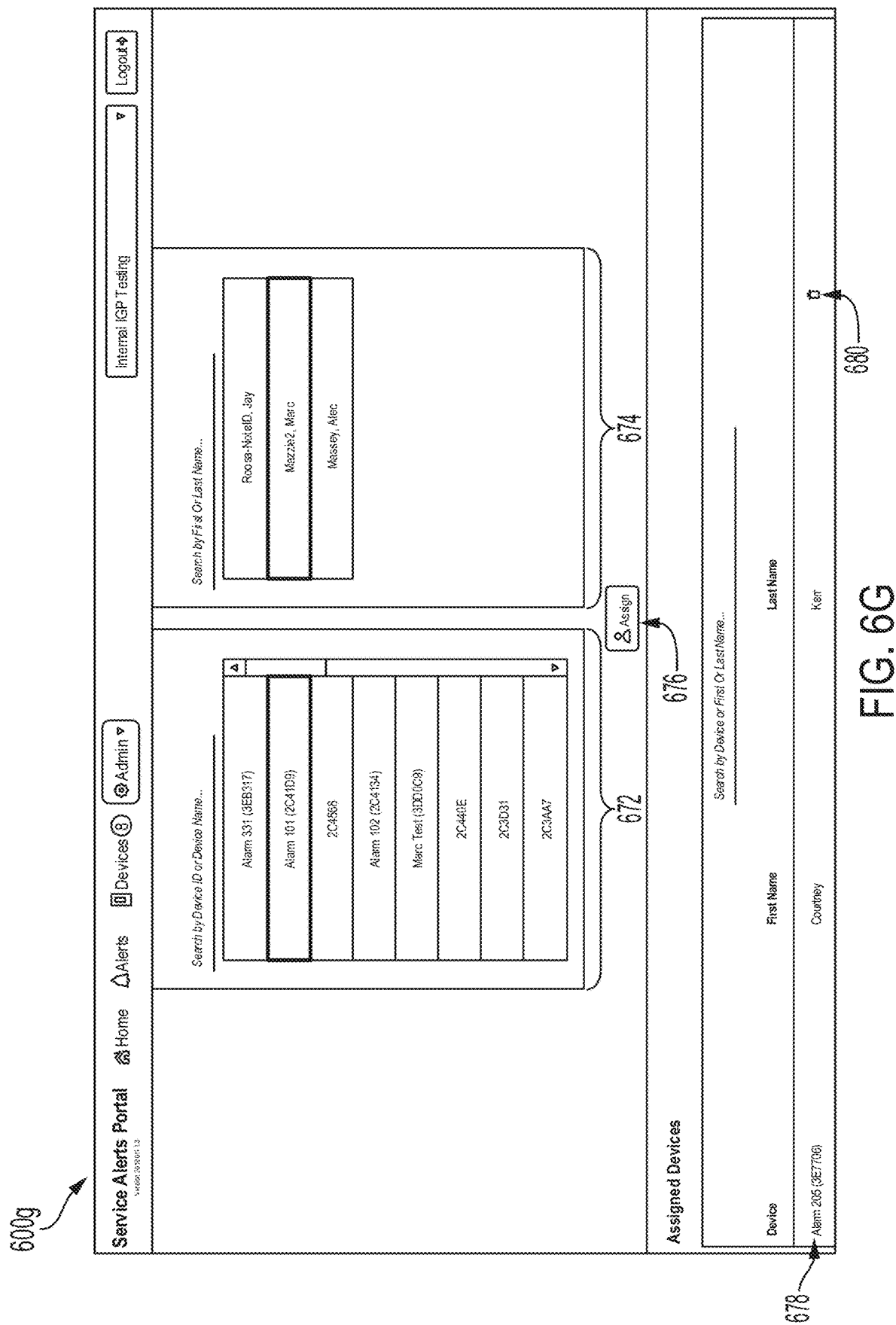

FIG. 6G shows screen 600g, which is a screen for assigning geolocation devices to persons, in accordance with some embodiments. In some embodiments, screen 600g may be accessed by selecting assignments icon 644 at screen 600b. In some embodiments, screen 600g may allow a user of the GUI to manage assignments of geolocation devices (e.g., stored data associating a geolocation device with a person or object to be tracked). In some embodiments, assigning geolocation devices to persons or object may allow a user of the GUI to know what person or object is associated with an alerting device when viewing an alert.

Screen 600g comprises available devices list 672 showing geolocation devices that are available for assignment to an entity, as well as available entities list 674 showing persons, object, or other entities that are available for assignment to a device. In some embodiments, one or both lists may be scrollable, searchable, and/or filterable. In some embodiments, a user of screen 600g may select one or more items from each list and then select (e.g., click or tap) selectable assign button 676 in order to execute the assignment by storing data representing an association between the selected device(s) and entity (or entities).

In some embodiments, one or more devices may only be able to be assigned to one entity at a time. In some embodiments, one or more entities may only be able to be assigned to one device at a time. In some embodiments, once a device or entity is assigned, it may no longer appear in list 672 or list 674.

Screen 600g further comprises device assignment entry 678, which shows information in columns indicating an identity of as associated assigned device, a first name of an associated assigned person, and a last name of an associated assigned person. Screen 600g further comprises selectable delete icon 680 associated with device assignment entry 678, which may be selected by a user to delete the device assignment entry and thereby disassociate any associated device(s) and entity (or entities) from one another in the system. In some embodiments, after deleting an assignment entry, any devices or entities associated with the deleted assignment entry may automatically reappear in list 672 or list 674.

Figure 6H:

FIG. 6H shows screen 600h, which is a screen for managing on-call persons, in accordance with some embodiments. In some embodiments, screen 600h may be accessed by selecting either one of on-call icon 626 at screen 600a or on-call icon 642 at screen 600b. In some embodiments, designating a person as on-call may cause the system to deliver one or more notifications to a device associated with that person. For example, a notification regarding a location determined for a geolocation device of system 100 may be forwarded to a device (e.g., administrator device 114) associated with a person who is indicated in the system as being on call.

In the example of FIG. 6H, screen 600h shows seven employee entries 682a-g, each of which shows respective information in columns indicating a first name for the employee, a last name for the employee, an email address for the employee (which may be an email address to which geolocation alerts are sent if/when the employee is on-call), and a phone number for the employee (which may be a phone number to which geolocation alerts are sent if/when the employee is on-call). Screen 600g further comprises selectable on-call indicators 684a-g, associated respectively with on-call employee entries 682a-g, which may display whether an employee is designated as on-call and may allow a user to toggle the employee's on-call status by clicking or tapping the indicator.

Figure 6I:
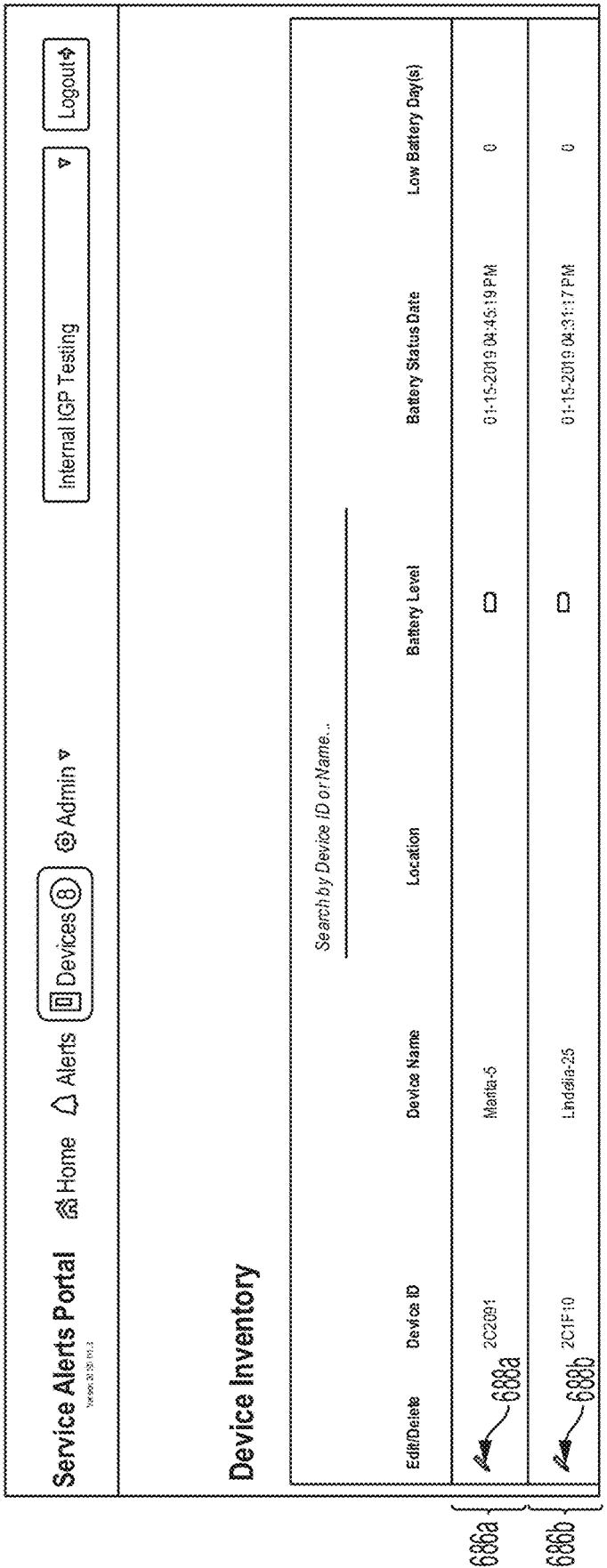

FIG. 6I shows screen 600i, which is a screen for managing geolocation devices, in accordance with some embodiments. In some embodiments, screen 600i may be accessed by selecting either one of devices icon 608 or devices icon 628 at screen 600a. In some embodiments, screen 600i may allow a user of the GUI to add, delete, or edit entries for geolocation devices associated with the system.

As shown in FIG. 6I, screen 600i comprises two device entries 686a and 686b, each of which shows respective information in columns indicating a device ID, a device name, a device location (if known), a device battery level, a date and/or time of a most recent battery level update, and a number of days the device has indicated a low-battery status. In some embodiments, battery level indication for devices may be shown on screen 600i textually and/or graphically. Screen 600g further comprises selectable edit device icons 688a and 688b, associated respectively with device entries 686a and 686b, which may be selected by a user in order to navigate to one or more screens for editing a device entry.

In some embodiments, one or more icons and/or other GUI objects for adding a new device and/or deleting an existing device may be included in screen 600i. In some embodiments, adding/registering new devices and/or deleting/deregistering devices may be executed by administrator functions not available through screen 600i (e.g., through a central system administrator functionality not executed through the GUI of FIGS. 6A-6K).

Figure 6J:
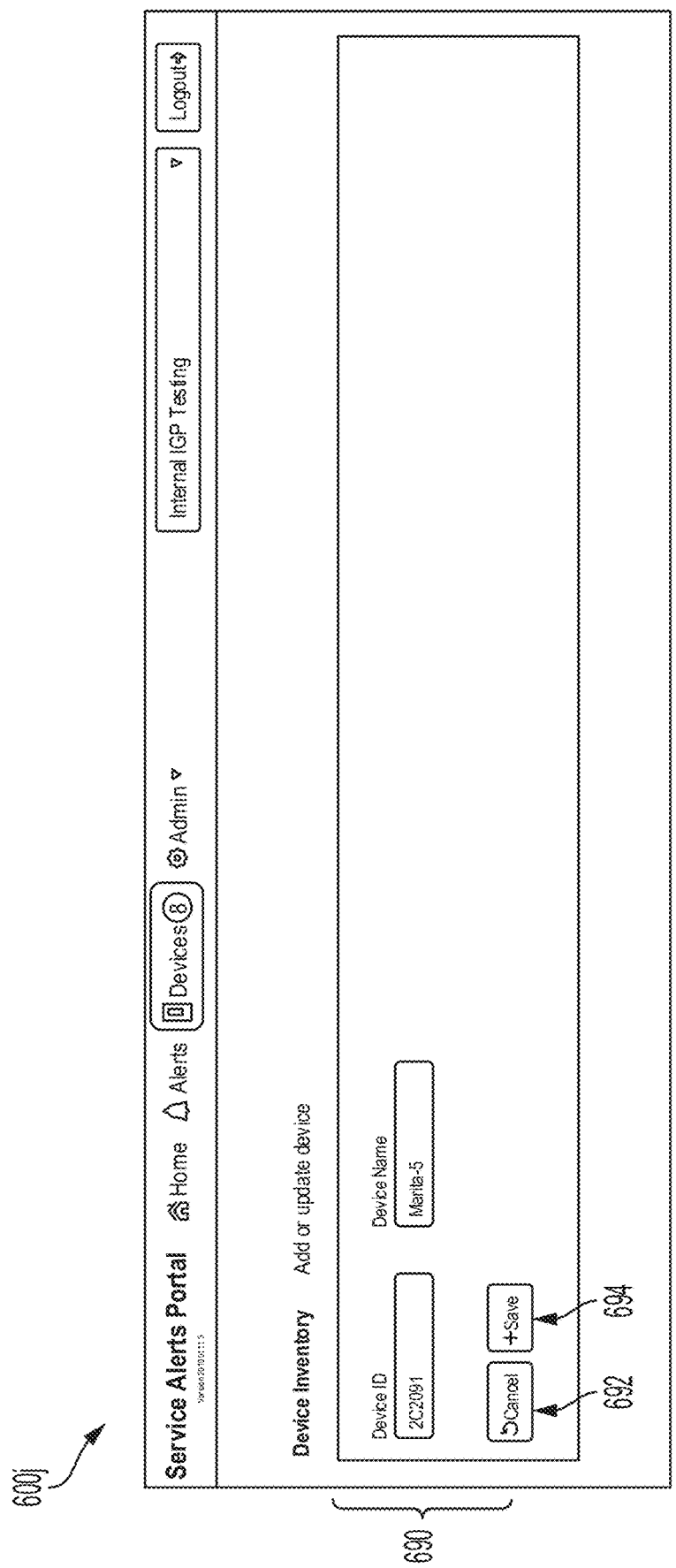

FIG. 6J shows screen 600j, which is a screen for creating or editing device information, in accordance with some embodiments. In some embodiments, screen 600j may be accessed by selecting either of edit device icons 688a or 688b at screen 600i.

Screen 600j comprises device information interface 690, which may comprise one or more fields and/or selectable options for device information. In the example shown, device information interface 690 comprises fields for a device ID and a device name. In some embodiments, some or all of the fields may be editable by a user, for example by typing to the field. In the embodiment shown, the device ID field is not editable, while the device name field is editable.

Screen 600j further comprises cancel button 692, which may be selected to cancel the operation for modifying the device information; and save button 694, which may be selected to save information entered into device information interface 690 to the corresponding device entry.

Figure 6K:
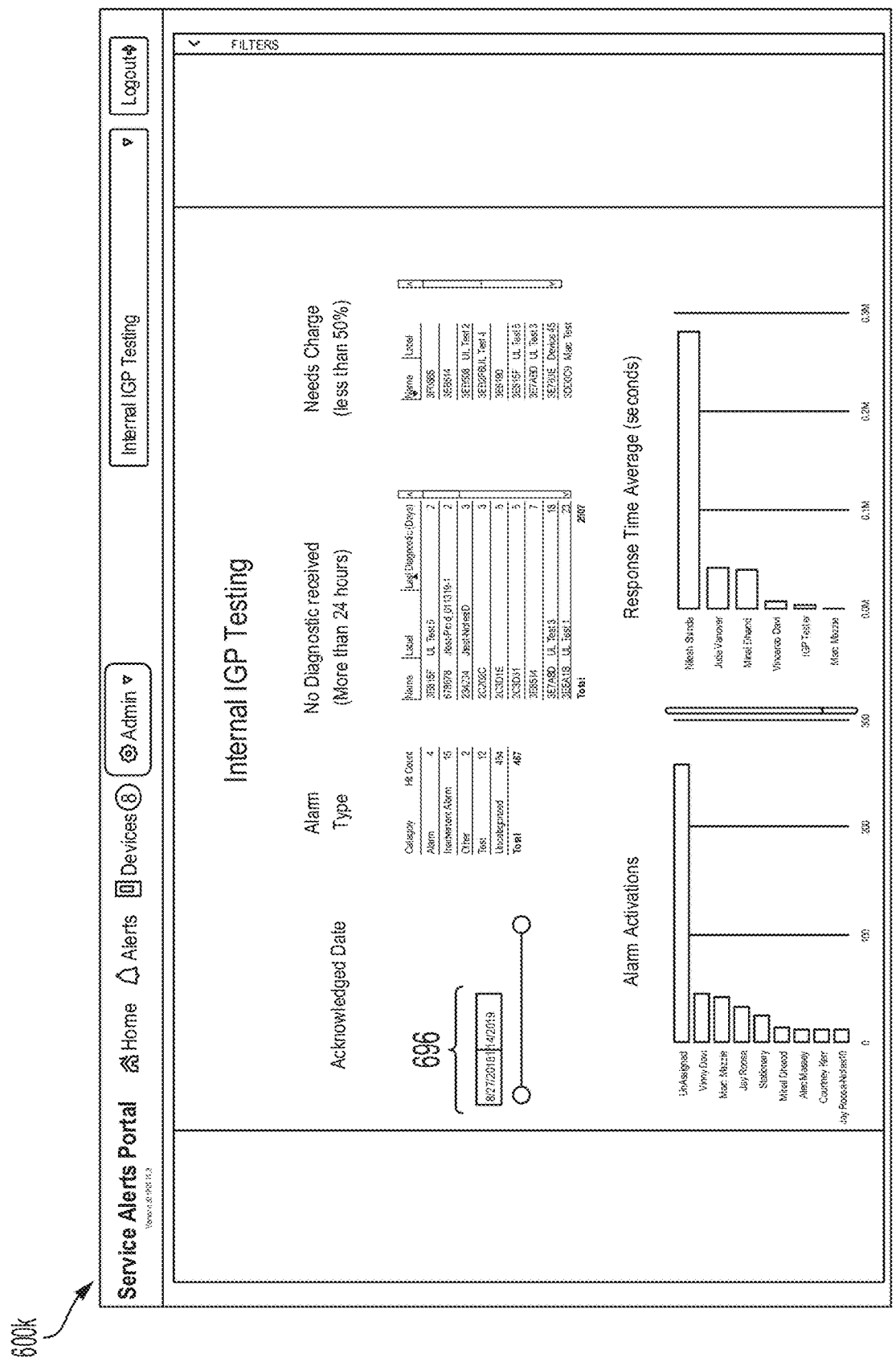

FIG. 6K shows screen 600k, which is a screen for viewing alarm and device data, in accordance with some embodiments. In some embodiments, screen 600k may display information about alerts, for example by categorizing alerts by type and/or by user. In some embodiments, screen 600k may display information regarding geolocation devices associated with the system that have not sent battery diagnostic messages in more than a predetermined amount of time, such as more than 12 hours, more than 24 hours, or more than 48 hours. In some embodiments screen 600k may display information regarding geolocation devices associated with the system that may need charge to be charged, such as devices whose battery level is below a predetermined threshold battery level (e.g., 10%, 25%, 50%, or 60%) or devices which have not sent a diagnostic message in more than a predetermined amount of time. In some embodiments, a user may be able to indicate a time- and/or date-range for the alert information displayed, such as by using sliders 696; alerts may be filtered by time and date of acknowledgement and/or by time and date of the alert being generated.

Attention is now directed to FIGS. 7-10. A wireless alarm device, system, and related techniques are disclosed. In accordance with some embodiments, the disclosed device may include a wireless radio configured to detect (e.g., "sniff" for) Wi-Fi and/or Bluetooth signals sourced by any wireless local area network (LAN) access points within range. Upon receiving a wireless LAN signal, the disclosed device may obtain identification data therefrom, including, for example, a media access control (MAC) address, a received signal strength indication (RSSI) value, or other desired LAN identifier associated with the source. In turn, the disclosed device may transmit a radio frequency (RF) signal including LAN identification data, optionally along with other desired data. From this data, the location of the disclosed device may be inferred based on the fixed location of the source wireless LAN access point, as designated when the wireless LAN infrastructure is installed and heat mapped (e.g., when the range of coverage of each access point is determined based on detected signal strength at a given physical location). In this manner, the disclosed device may provide information pertaining to its location relative to wireless LAN access point(s) within range. In accordance with some embodiments, the disclosed device may be configured to operate, in a general sense, as an internet-of-things (IoT)-based personal alarm, sometimes referred to as a panic button. In accordance with some embodiments, the disclosed device may be configured to operate, in a general sense, as a dedicated SigFox (or other IoT service provider) radio device. Numerous configurations and variations will be apparent in light of this disclosure.

Radio-based communication systems are used in various enterprises and facilities in monitoring the safety of personnel. With existing approaches, personal alarm devices carried by personnel typically are bulky and cumbersome, are prone to false alarm activations, and have sufficient power to operate only for a very limited time before their batteries are depleted and the devices stop working. Furthermore, installing the infrastructure to enable safety monitoring is normally quite expensive. In addition, global positioning system (GPS)-based devices with cellular communications are an option that is too expensive for widespread use due to the high cost of the unit, installation costs, and cellular connection fees. Moreover, GPS-based options do not operate sufficiently indoors and have high power consumption requirements.

Thus, and in accordance with some embodiments of the present disclosure, a wireless alarm device, system, and related techniques are disclosed. In accordance with some embodiments, the disclosed device may include a wireless radio configured to detect (e.g., "sniff" for) Wi-Fi and/or Bluetooth signals sourced by any wireless local area network (LAN) access points within range. Upon receiving a wireless LAN signal, the disclosed device may obtain identification data therefrom, including, for example, a media access control (MAC) address, a received signal strength indication (RSSI) value, or other desired LAN identifier associated with the source. In turn, the disclosed device may transmit a radio frequency (RF) signal including LAN identification data, optionally along with other desired data. From this data, the location of the disclosed device may be inferred based on the fixed location of the source wireless LAN access point, as designated when the wireless LAN infrastructure is installed and heat mapped (e.g., when the range of coverage of each access point is determined based on detected signal strength at a given physical location). In this manner, the disclosed device may provide information pertaining to its location relative to wireless LAN access point(s) within range. In accordance with some embodiments, the disclosed device may be configured to operate, in a general sense, as an internet-of-things (IoT)-based personal alarm, sometimes referred to as a panic button. In accordance with some embodiments, the disclosed device may be configured to operate, in a general sense, as a dedicated SigFox (or other IoT service provider using a LPWAN technology such as SigFox, LoRa, NB-IoT, or LTE-Cat M) radio device.

In accordance with some embodiments, the disclosed wireless alarm device may be configured to be operated by a user such that, upon activation of an alarm function of the device, the device transmits an RF signal including data that may be utilized in determining the physical location of the device (and, thus, the user) relative to wireless LAN access point(s) within range. In some embodiments, the disclosed device may be configured to be carried by a user, whereas in some other embodiments, the disclosed device may be mountable, installable, or otherwise configured to be disposed at a given location for operation by a user. When received, for example, by an internet-of-things (IoT) service provider, information from the RF signal transmitted by the disclosed device may be delivered through the internet to a server database, which may be cloud-based in some instances. In an example case, an IoT service provider such as SigFox S.A. may be utilized to such end. A given backend customer that subscribes to or otherwise receives services from a given upstream IoT service provider may access the information stored at the server database directly or through one or more authorized (e.g., customer-licensed) backend service providers. Any of a wide range of backend service providers may be utilized, such as, for example, geolocation services, emergency services, or law enforcement services, to name a few. In accordance with some embodiments, a given backend service provider may access (with authorization) the information stored at the server database to determine the location of the disclosed device, as well as control overall system operation. In accordance with some embodiments, metadata acquired via the disclosed device may be utilized to feed geolocation engines (e.g., such as Google Geolocation Services) and heat mapping applications (e.g., such as Umajin), as well as OpenSource solutions, such as the Framework for Internal Navigation and Discovery (FIND), among other options.

As will be appreciated in light of this disclosure, the disclosed device may be utilized in any target space where physical location can be heat mapped via one or more proximate wireless LAN access points. In accordance with some embodiments, the disclosed device may be utilized as a personal alarm permitting as-needed monitoring within a given target space. In accordance with some embodiments, the disclosed device may be utilized by personnel, such as hotel personnel (e.g., housekeepers) and bank personnel (e.g., tellers). In accordance with some embodiments, the disclosed device may be utilized with assets of interest, such as laundry, housekeeping, and luggage carts, room service tray returns, expensive consumables, and holiday decorations, among others. Numerous suitable uses and applications will be apparent in light of this disclosure.

Some embodiments may realize one or more advantages or benefits, as compared to existing approaches. For instance, in some embodiments, the disclosed device may be lightweight with a small form factor (e.g., about 2 inches×2 inches or smaller), making it compact, concealable, and inconspicuous, while still being physically robust. In some embodiments, the disclosed device may be rechargeable and characterized as low-maintenance, in some instances needing to update only if the wireless LAN footprint of a target alarm monitoring space changes. Some embodiments of the disclosed device may include multiple buttons that must be actuated to initiate an alarm mode, thereby reducing the opportunity for false alarms caused by accidental activation of only a single button. Some embodiments of the disclosed device may include an audio and/or optical output device that emits in a manner indicative to a user or bystander that the alarm function of the wireless alarm device has been activated or that the power level is low. Some embodiments may include using standard AAA batteries. Some embodiments may include haptic feedback (vibration)

In accordance with some embodiments, the disclosed device can be used to transmit an alarm signal reliably without revealing its presence, if desired. That is, the disclosed device may transmit effectively while concealed or inconspicuously placed. Moreover, the disclosed device need not be registered with any wireless LAN access points within the target space to be monitored. In accordance with some embodiments, the disclosed device may be carried and operated in a manner that maintains the privacy of the user. For instance, the disclosed device may be configured such that it cannot track the user until activated by the user (e.g., upon actuating one or more buttons). In at least some such instances, the disclosed device may be configured such that it operates only as a one-way transmitting device. As such, the user can be confident that any potentially unwanted monitoring parties are prevented from turning on the disclosed device independent of the user's operation.

FIG. 7 illustrates a wireless communication system 10000 configured in accordance with an embodiment of the present disclosure. As can be seen, system 10000 may include (or otherwise may involve in its operation) one or more wireless local area network (LAN) access points 1000, a wireless alarm device 2000, an internet-of-things (IoT) service provider 3000, the Internet 4000, a server database 5000, a backend customer 6000, and a backend service provider 7000. Each of these various elements is discussed in turn below. More generally, FIG. 7 illustrates communicative coupling of the various constituent elements of system 10000 and the overall flow of data within system 10000, in accordance with some embodiments.

Figure 8:
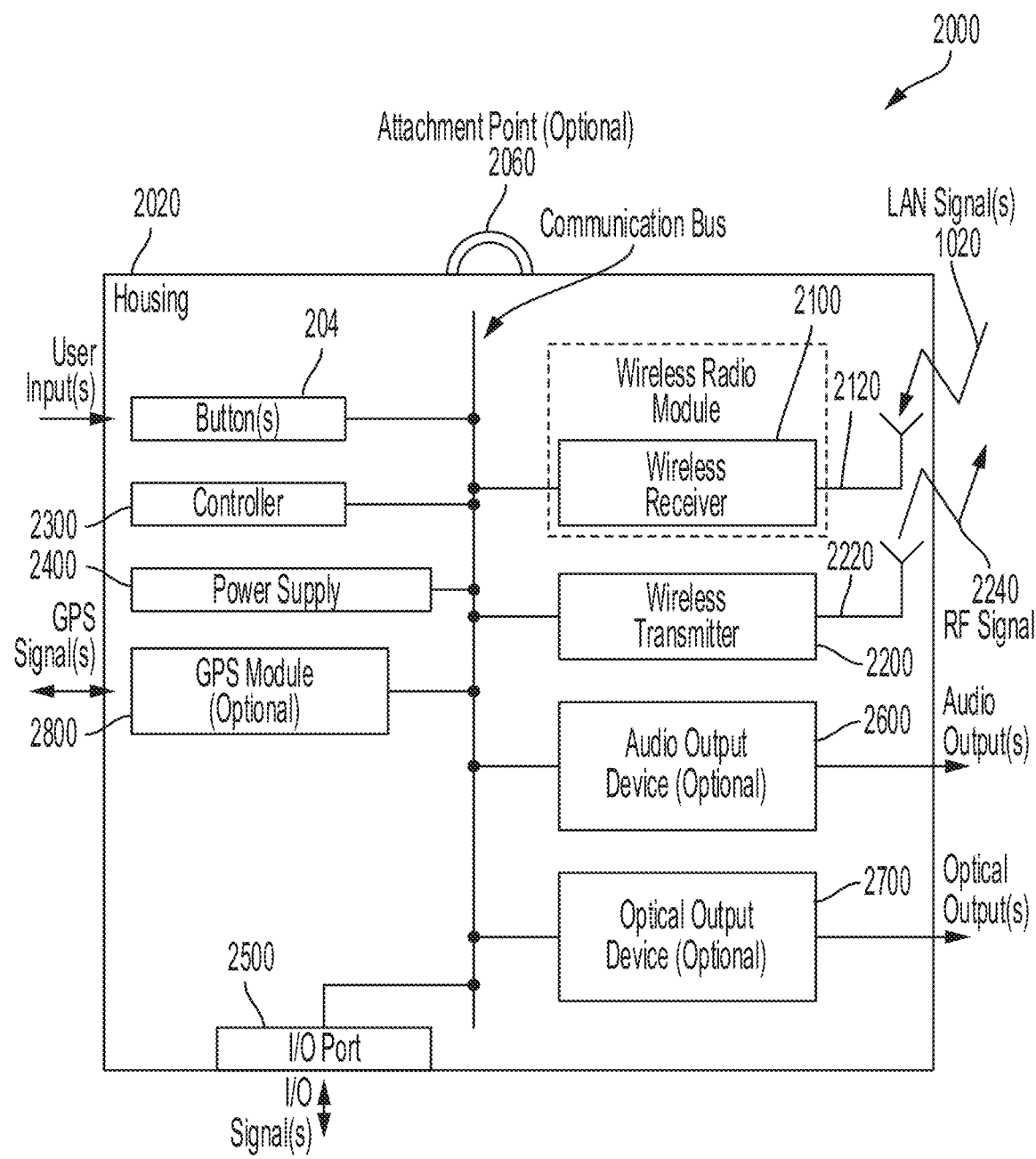
FIG. 8 shows a block diagram of a wireless alarm device, in accordance with some embodiments.
Figure 9A:
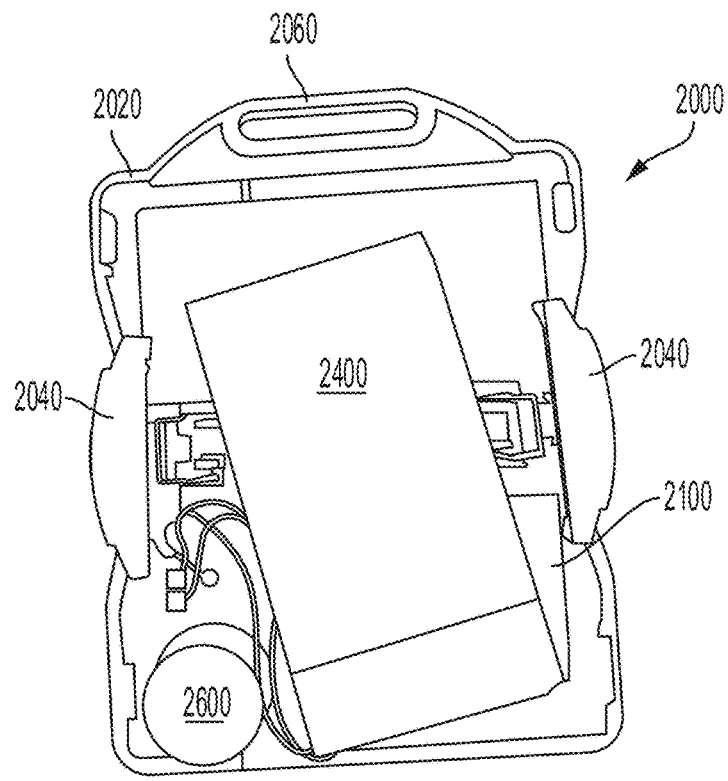
FIGS. 9A-9D show a wireless alarm device, in accordance with some embodiments.
Figure 9B:
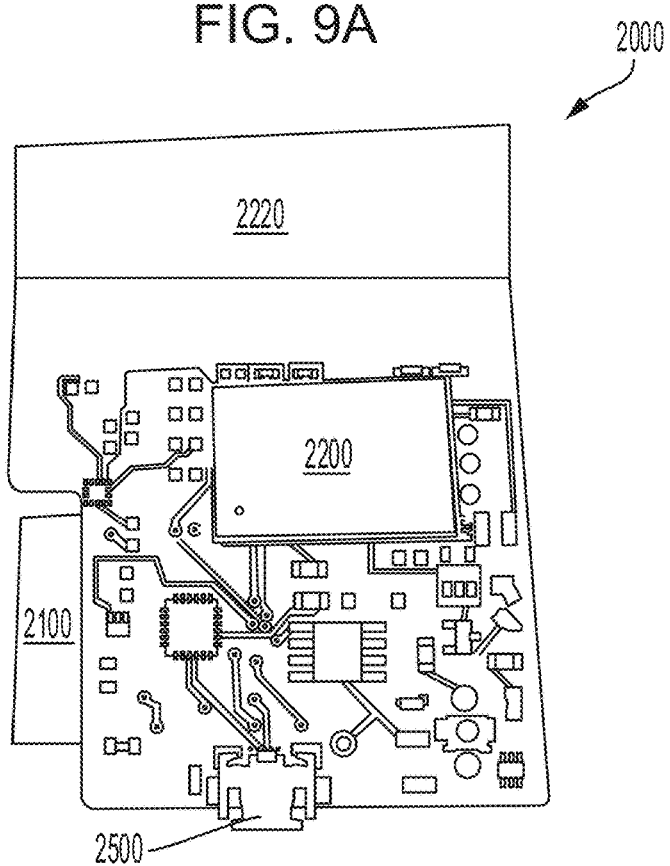
Figure 9C:
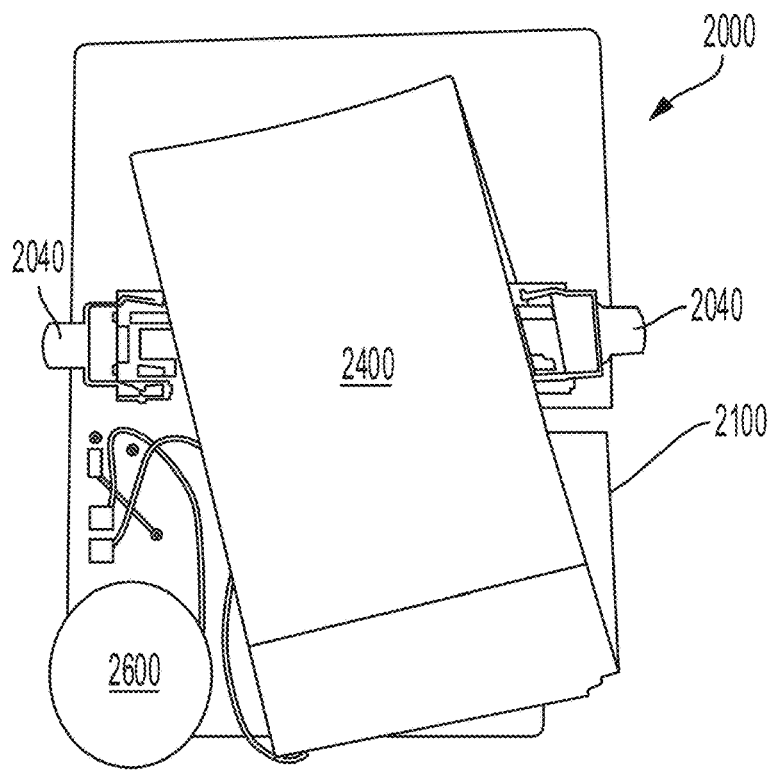
Figure 9D:
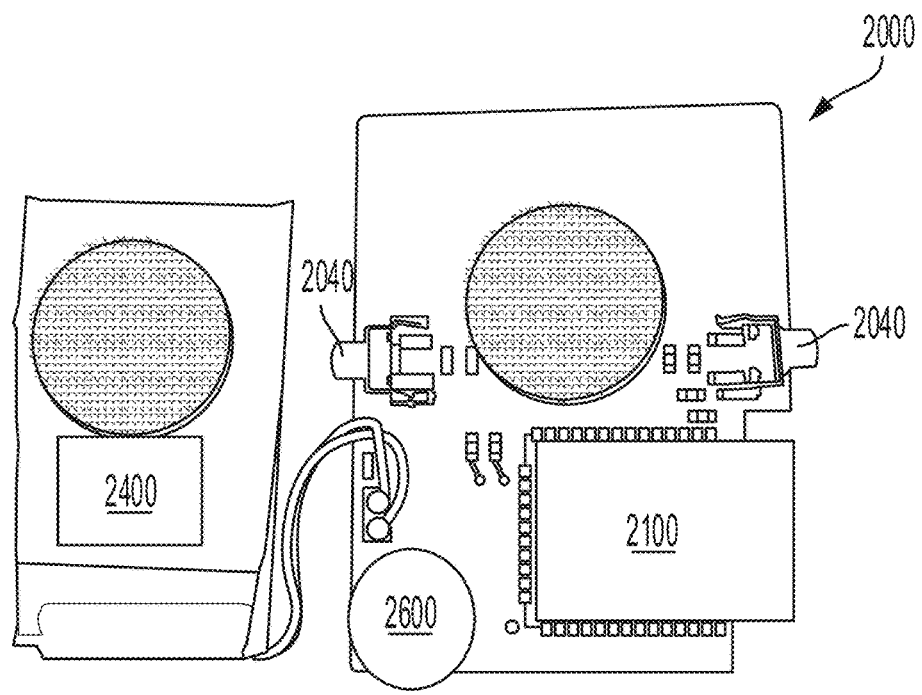

FIG. 8 is a block diagram of a wireless alarm device 2000 configured in accordance with an embodiment of the present disclosure. As can be seen, device 2000 may include a wireless receiver 2100, a wireless transmitter 2200, a controller 2300, a power supply 2400, and an I/O port 2500. In some embodiments, device 2000 optionally may include any one, or combination, of an audio output device 2600, an optical output device 2700, and a GPS module 2800. As can be seen further, device 2000 also may include a housing 2020, one or more buttons 2040, and (optionally) an attachment point 2060. Each of these various elements is discussed in turn below. FIGS. 9A-9D are several photographs illustrating an example wireless alarm device 200 configured in accordance with an embodiment of the present disclosure.

Wireless receiver 2100 may be (or otherwise may be part of) a wireless radio module configured to detect (e.g., "sniff" for) any Wi-Fi and/or Bluetooth signals within range. More generally, wireless receiver 2100 may be either a dedicated receiver device provided with only receiving capabilities or a transceiver device provided with both receiving and transmitting capabilities. In some embodiments, wireless receiver 2100 may be, for example, a radio frequency (RF) device configured to receive and/or transmit signals of a frequency in either (or both) a 2.4 GHz band or a 5.0 GHz band. In an example case, wireless receiver 2100 may be (or otherwise may be part of) an Espressif Wi-Fi and Bluetooth system-on-chip (SoC) wireless radio module.

As a wireless communication device, wireless receiver 2100 may include (or otherwise be operatively coupled with) an antenna 2120 configured to receive and/or transmit one or more signals, such as a wireless LAN signal 1020 from a wireless LAN access point 1000 (discussed below). To that end, antenna 2120 may be, for example, a printed circuit board (PCB) antenna configured as typically done or any other suitable antenna, as will be apparent in light of this disclosure. Antenna 2120 optionally may be optimized in configuration for a specific frequency band; for instance, in an example case, antenna 2120 may be optimized for reception of a wireless LAN signal 1020 of a frequency in either (or both) a 2.4 GHz band or a 5.0 GHz band.

Wireless transmitter 2200 may be (or otherwise may be part of) a short-wavelength ultra-high frequency (UHF) radio frequency (RF) device configured to transmit and/or receive signals of a frequency in a 902 MHz ISM band (e.g., about 902-928 MHz). More generally, wireless transmitter 2200 may be either a dedicated transmitter device provided with only transmitting capabilities or a transceiver device provided with both transmitting and receiving capabilities. In at least some cases, wireless transmitter 2200 may be configured solely to have transmitting capabilities, such that device 2000 operates without contributing to any unwanted tracking of a user thereof.

As a wireless communication device, wireless transmitter 2200 may include (or otherwise be operatively coupled with) an antenna 2220 configured to transmit and/or receive one or more signals, such as an RF signal 2240 (discussed below). To that end, antenna 2220 may be, for example, a PCB antenna configured as typically done or any other suitable antenna, as will be apparent in light of this disclosure. Antenna 2220 optionally may be optimized in configuration for a specific frequency band; for instance, in an example case, antenna 2220 may be optimized for transmission of an RF signal 2240 of a frequency in a 902 MHz ISM band (e.g., about 902-928 MHz). In some instances, antenna 2220 may be a broadband antenna, which optionally may be dielectrically loaded (e.g., to facilitate efficient operation even when device 2000 is near metal, bystanders, or other sources of signal interference). Thus, at least in some embodiments, antenna 2220 may have no need for a tuning circuit, though one optionally may be included. In accordance with some embodiments, the effective length of antenna 2220 may be optimized for a given desired transmission band (e.g., 902 MHz ISM band) or otherwise customized, as desired.

In some embodiments, device 2000 may include a controller 2300 configured to provide processing and/or memory capabilities, in part or in whole, for device 2000. To such ends, in at least some embodiments, controller 2300 may include a processor core, memory, and one or more programmable input/output (I/O) ports. More generally, controller 2300 may be configured, at least in some embodiments, as a central processing unit (CPU), a microcontroller unit (MCU), a system-on-chip (SoC), or any other suitable processing element, as will be apparent in light of this disclosure. In some other embodiments, device 2000 may include memory and one or more processors instead of (or in addition to) a controller 2300.

Power supply 2400 may be configured to supply a given amount of power to any of the various components of device 2000. In some embodiments, power supply 2400 may be a battery, which may be permanent or replaceable. In accordance with some embodiments, controller 2300 (or a processor or other processing element) may be configured to check the power level of power supply 2400 periodically or as otherwise desired. In an example case, the power level of power supply 2400 may be checked at least once daily. As discussed below, device 2000 may transmit an RF signal 2240 including data pertaining to the power level of power supply 2400, in accordance with some embodiments.

Device 2000 also may include an input/out (I/O) port 2500. In accordance with some embodiments, power supply 2400 may be charged and firmware of device 2000 may be updated through I/O port 2500. In accordance with some embodiments, one or more external sensors may be operatively coupled with device 2000 through I/O port 2500.

In some embodiments, device 2000 optionally may include an audio output device 2600, which may be a speaker, beeper, screamer, or any other device capable of emitting sound of a given frequency, optionally with a given emission period or pattern. In accordance with some embodiments, audio output device 2600 may be configured to output audio output signal(s) indicative of a given condition with respect to the operation of device 2000. For instance, in some cases, audio output device 2600 may emit a sound indicative of activation of an alarm function of device 2000. In some cases, audio output device 2600 may emit a sound indicative of a low power level of power supply 2400.

In some embodiments, device 2000 optionally may include an optical output device 2700, which may be a solid-state light source, such as a light-emitting diode (LED), or any other device capable of emitting light of a given wavelength, optionally with a given emission period or pattern. In accordance with some embodiments, optical output device 2700 may be configured to output optical output signal(s) indicative of a given condition with respect to the operation of device 2000. For instance, in some cases, optical output device 2700 may be configured to emit light indicative of any one, or combination, of the various example conditions discussed above with respect to audio output device 2600. In some embodiments device 2000 may include the ability to provide haptic feedback.

As can be seen further from FIG. 8, device 2000 may include a housing 2020 configured to house, in part or in whole, any of the various components of device 2000. The material construction and dimensions of housing 2020 may be customized, as desired for a given target application or end-use. In accordance with some embodiments, housing 2020 may be configured to be donned by a user. To that end, in some embodiments, device 2000 optionally may include one or more attachment points 2060, which may be configured, for example, for having a lanyard, keyring, clip, or other suitable means attached thereat. To such ends, the specific configuration of attachment point(s) 2060 may be customized, as desired for a given target application or end-use. In accordance with some embodiments, housing 2020 may be configured to be mounted, for example, to a piece of equipment, clothing, or other article desired by a given user using any suitable mounting means, as will be apparent in light of this disclosure. For instance, device 2000 may be configured for mounting via any one, or combination, of mechanical fasteners (e.g., such as screws, bolts, clamps, or clips, to name a few), adhesive materials (e.g., glue, epoxy, foam tape, or hook-and-loop fasteners, to name a few), or magnetic materials. Housing 2020 may be of water-resistant, dust-resistant, and/or impact-resistant construction. In some instances, housing 2020 may be configured to interface with a protective cover or case, the construction of which may be customized, as desired for a given target application or end-use.

Device 2000 further may include one or more buttons 2040, which may be programmable and either a physical control feature (e.g., a physical button, switch, knob, pressure sensor, toggle, slider, and so forth) or a virtual control feature (e.g., a touch-sensitive icon or other element providing any one or more of the aforementioned physical control feature functionalities). In accordance with some embodiments, device 2000 may include at least one button 2040 that, when actuated, permits wireless receiver 2100 to look for wireless LAN signals 102 within range. In accordance with some embodiments, device 2000 may include at least one button 2040 that, when actuated, permits wireless transmitter 2200 to transmit an RF signal 2240 (discussed below). In some instances, actuation of at least one button 2040 may provide for permitting both detection by wireless receiver 2100 and transmission by wireless transmitter 2200. Any duration threshold for actuation of button(s) 2040 may be customized, as desired for a given target application or end-use. In an example case, a given button 2040 may need to be actuated for about 1 sec or more before permitting the aforementioned detection and/or transmission (e.g., permitting activation of an alarm mode of device 2000). In an example case, device 2000 may include at least two separate buttons 2040 that must be actuated simultaneously to effectuate the aforementioned permissions (e.g., in activating an alarm mode of device 2000). At least in some instances, the inclusion of multiple buttons 2040 may help to eliminate (or otherwise reduce) false alarm activations of device 2000. In some cases, a given button 2040 optionally may be lighted and/or provided with haptic feedback capabilities.

It should be noted that device 2000 is not intended to be limited only to the example configurations described above and illustrated in FIG. 8, as numerous other configurations and variations will be apparent in light of this disclosure. For instance, in some other embodiments, any (or all) of wireless receiver 2100, wireless transmitter 2200, and controller 2300, may be provided as a single device having the capabilities of each noted component. Moreover, in some embodiments, device 2000 may include one or more sensors configured to detect a given condition or stimulus of interest, such as, for example, temperature or pressure, among others.

In accordance with some embodiments, device 2000 may be configured, in a general sense, as a SigFox radio device, a SigFox and GPS device, a SigFox and Wi-Fi sniffer device, or a SigFox, GPS, and Wi-Fi sniffer device. In accordance with some embodiments, device 2000 may be configured, in a general sense, as a SigFox WiSOL-based device.

In accordance with some embodiments, RF signal 2240 may be of a frequency in a 902 MHz ISM band (e.g., of a frequency in the range of about 902-928 MHz) or in the 915 MHz ISM band. In accordance with some embodiments, RF signal 2240 may include data obtained from a LAN signal 1020 received from a given wireless LAN access point 1000 within range of device 2000. For instance, in accordance with some embodiments, RF signal 2240 may include data pertaining to either (or both) a MAC address and an RSSI value associated with the wireless LAN access point 1000 that sourced the received LAN signal 1020. In some instances, a full MAC address and RSSI may be included. In some other instances, a hashed MAC address that points to a value in a lookup table may be included (e.g., to compress the MAC address from 6 bytes to 2 bytes).

In accordance with some embodiments, device 2000 may be configured to transmit RF signal 2240 periodically, upon a designated triggering event (e.g., upon receipt by device 2000 of a user input via one or more buttons 2040), or otherwise as desired. In some cases, device 2000 may be configured to transmit RF signal 2240 at least once a day by default, which may help to confirm whether device 2000 is functional and optionally may include a reporting of the power level of power supply 2400.

Returning to FIG. 7, as previously noted, system 10000 may involve one or more wireless LAN access points 1000, such as, for example, a wireless router device of standard, customized, or proprietary configuration. A given wireless LAN access point 1000 may be configured with either (or both) wireless transmitting and wireless receiving capabilities and, at least in some instances, may be either (or both) a Wi-Fi-compatible and Bluetooth-compatible device. In accordance with some embodiments, a given wireless LAN access point 1000 may be configured to transmit LAN signal(s) 1020, which may be Wi-Fi and/or Bluetooth signals. In some cases, a given LAN signal 1020 may be of a frequency in either (or both) a 2.4 GHz band or a 5.0 GHz band.

As can be seen further from FIG. 7, system 10000 also may involve an IoT service provider 3000. As will be appreciated in light of this disclosure, IoT service provider 3000 may provide any of a wide range of IoT services, for instance, to a given backend customer 6000, as desired. Some example suitable IoT service providers 3000 may include SigFox S.A., Long range (LoRa) digital wireless data communication providers, and Narrowband IoT (NB-IoT) providers, among others. In some instances, IoT service provider 3000 may provide its services as part of a subscription, with the subscription fees being paid by the backend customer 6000. To facilitate communication within system 10000, a given IoT service provider 3000 may deploy a station at a given target location where signal monitoring is to be provided. In some instances, a given IoT service provider 3000 may permit uplink only from device(s) 2000 within range, whereas in some other instances, both uplink and downlink may be provisioned. At least in some cases, IoT service provider 3000 may forward data obtained from RF signal 2240 over the internet 4000 to one or more downstream server databases 5000. In some instances, additional data, such as, for example, device ID, transmit time, and other metrics related to transmission may be forwarded as well.

As in FIG. 7, system 10000 further may involve of one or more backend service providers 7000. As will be appreciated in light of this disclosure, a given backend service provider 7000 may provide any of a wide range of services, for instance, to a given backend customer 6000, as desired. Some example suitable backend service providers 7000 may include geolocation services, such as Google Geolocation Services or the like, law enforcement services, and emergency response services, among others. At least in some cases, a given backend service provider 7000 may retrieve data from server database(s) 5000 and provide compiling, analytics, or other desired big data services in relation thereto to a given backend customer 6000.

Figure 10:
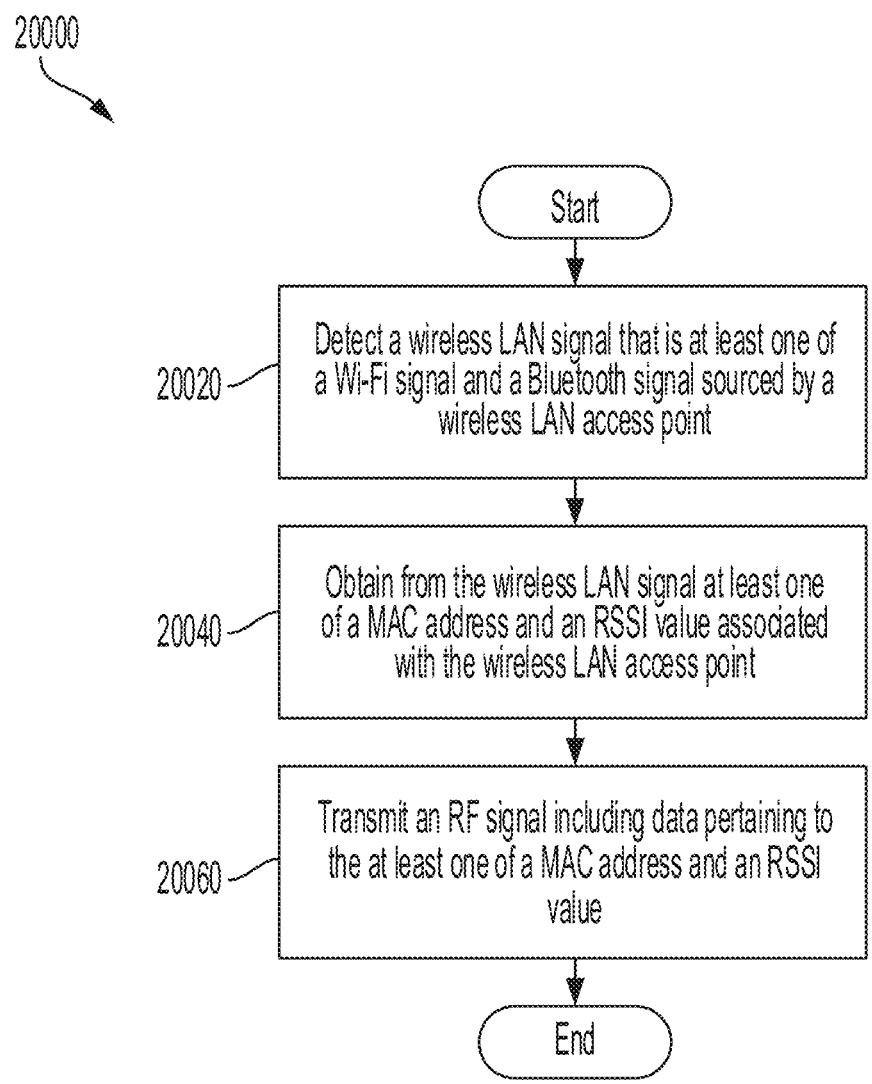
FIG. 10 shows a flow chart showing a method of wireless communication via a wireless alarm device, in accordance with some embodiments.

FIG. 10 is a flow diagram illustrating a method 20000 of wireless communication via a wireless alarm device 2000, in accordance with an embodiment of the present disclosure. As can be seen, method 20000 may begin as in block 20020 with detecting a wireless LAN signal 1020 that is at least one of a Wi-Fi signal and a Bluetooth signal sourced by a wireless LAN access point 1000. To that end, wireless receiver 2100 of device 2000 may be utilized, in accordance with some embodiments. In accordance with some embodiments, a given button 2040 of device 2000 may be actuated to permit wireless receiver 2100 to operate in this manner. Method 20000 may continue as in block 20040 with obtaining from the LAN signal 1020 at least one of a MAC address and an RSSI value associated with the source wireless LAN access point 1000. Method 20000 may continue as in block 20060 with transmitting an RF signal 2240 including data pertaining to the at least one of a MAC address and an RSSI value. To that end, wireless transmitter 2200 of device 2000 may be utilized, in accordance with some embodiments. In accordance with some embodiments, a given button 2040 of device 2000 may be actuated to permit wireless transmitter 2200 to operate in this manner.

As will be appreciated in light of this disclosure, wireless alarm device 2000 (or system 10000 more generally) may be utilized in any of a wide range of applications and contexts. For example, in accordance with some embodiments, device 2000 may be utilized in monitoring the safety of personnel in a facility, such as a hotel, or students and staff on a college campus, healthcare works in a hospital or the elderly in a retirement community, to name a few. In accordance with some embodiments, device 2000 may be utilized in calling for the assistance of a hospitality representative, such as an attendant or waiter. For instance, such a representative may be summoned via device 2000 to bring water, food, ice, menu, the bill, etc. In accordance with some embodiments, device 2000 may be utilized in conjunction with a geolocation service provider providing 2-D mapping of a given alarm monitoring location, as well as with a heat mapping approach providing 3-D mapping of a given alarm monitoring location. Thus, within the example context of a multi-level building, such as a hotel or office, that has been properly heat-mapped/signal mapped, the location of device 2000 may be accurately determined with respect to the floor of the building (e.g., about 100% geolocation accuracy) and within about 30 feet or less, which may be three or fewer doors (e.g., about 90% geolocation accuracy), in an example case. In accordance with some embodiments, device 2000 may be utilized (e.g., in conjunction with a wireless monitor tool, such as a mobile computing device with an appropriate application) in heat mapping by surveying a given target space, capturing MAC addresses and/or RSSI values near each location of interest (e.g., outside each room in a building), and forwarding that data to be stored in a server database 5000 for access when an alarm function of device 2000 is activated.

Figure 11:
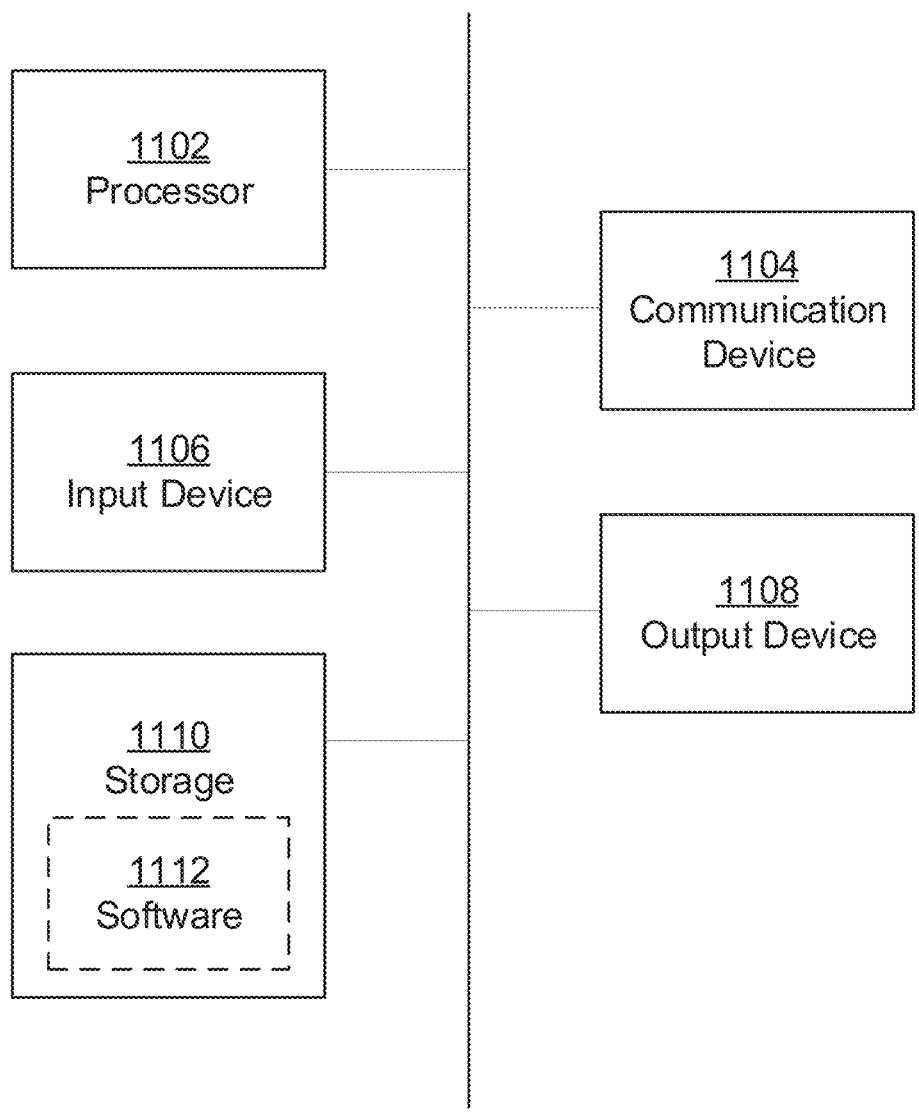
FIG. 11 shows a computer, in accordance with some embodiments.

FIG. 11 illustrates a computer, in accordance with some embodiments. Computer 1100 can be a component of a geolocation system and/or a wireless communication system, such as system 100 and/or any of its subcomponents, device 200, device 300, system 10000 and/or any of its subcomponents, and/or device 2000. In some embodiments, computer 1100 is configured to execute a method for geolocation and/or a method of wireless communication, such as all or part of one or more of methods 400, 500, and/or 20000 of FIGS. 4, 5, and 10, respectively. In some embodiments, computer 1100 may be configured to serve as a device for displaying and/or controlling a user interface for a geolocation system, such as device 114 in FIG. 1. In some embodiments, computer 1100 may be configured display and/or control a user interface for a geolocation system, such as the user interface depicted in FIGS. 6A-6K. In some instances computer 1100 may include or communicate with a SMS server that may send an alert to a mobile phone.

Computer 1100 can be a host computer connected to a network. Computer 1100 can be a client computer or a server. As shown in FIG. 11, computer 1100 can be any suitable type of microprocessor-based device, such as a personal computer; workstation; server; or handheld computing device, such as a phone or tablet. The computer can include, for example, one or more of processor 1110, input device 1120, output device 1130, storage 1140, and communication device 1160.

Input device 1120 can be any suitable device that provides input, such as a touch screen or monitor, keyboard, mouse, or voice-recognition device. Output device 1130 can be any suitable device that provides output, such as a touch screen, monitor, printer, disk drive, or speaker.

Storage 1140 can be any suitable device that provides storage, such as an electrical, magnetic, or optical memory, including a RAM, cache, hard drive, CD-ROM drive, tape drive, or removable storage disk. Communication device 1160 can include any suitable device capable of transmitting and receiving signals over a network, such as a network interface chip or card. The components of the computer can be connected in any suitable manner, such as via a physical bus or wirelessly. Storage 1140 can be a non-transitory computer-readable storage medium comprising one or more programs, which, when executed by one or more processors, such as processor 1110, cause the one or more processors to execute methods described herein, such as all or part of one or more of methods 300, 400, 500, or 20000 described with respect to FIGS. 3, 4, 5, and 10, respectively.

Software 1150, which can be stored in storage 1140 and executed by processor 1110, can include, for example, the programming that embodies the functionality of the present disclosure (e.g., as embodied in the systems, computers, servers, and/or devices as described above). In some embodiments, software 1150 can be implemented and executed on a combination of servers such as application servers and database servers.

Software 1150 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1140, that can contain or store programming for use by or in connection with an instruction execution system, apparatus, or device.

Software 1150 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1100 can implement any operating system suitable for operating on the network. Software 1150 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A geolocation system for determining a location in a three-dimensional space, the system comprising:
   a plurality of base stations, the plurality of base stations configured to receive data via a low-power wide-area network communication;
   a mobile device movable about the three-dimensional space, the mobile device comprising a set of one or more detection antennas configured to detect electromagnetic signals in the three-dimensional space and a transmission device configured to transmit signals via the low-power wide-area network communication; and
one or more servers;
wherein the system is configured to:
detect, via the set of one or more detection antennas of the mobile device, a plurality of electromagnetic signals in the three-dimensional space;
generate, at the mobile device, a signal profile based on the plurality of electromagnetic signals, wherein the signal profile comprises information about a subset of the plurality of electromagnetic signals; and
transmit, via the transmission device of the mobile device using the low-power wide-area network communication, the signal profile to one or more of the plurality of base stations;
determine, by the one or more servers, based on a comparison of the signal profile received by the one or more of the plurality of base stations to stored data regarding signal profiles at a plurality of locations in the three-dimensional space, the location in the three-dimensional space of the mobile device.

2. The system of claim 1, wherein the system is further configured to, in response to receiving the signal profile at the one or more of the plurality of base stations, transmit the signal profile from the one or more of the plurality of base stations to the one or more servers.

3. The system of claim 1, wherein the plurality of electromagnetic signals in the three-dimensional space comprises signals emitted by one or more of: Wi-Fi access points, Bluetooth devices, network-enabled appliances, network-enabled infrastructure devices, and IoT devices.

4. The system of claim 1, wherein the plurality of electromagnetic signals in the three-dimensional space does not comprise signals emitted by one of more of the plurality of base stations.

5. The system of claim 1, wherein generating the signal profile based on the plurality of electromagnetic signals comprises comparing the plurality of electromagnetic signals to a predefined list of electromagnetic signals to select the subset of the plurality of electromagnetic signals based on the predefined list.

6. The system of claim 1, wherein the stored data regarding signal profiles at a plurality of locations in the three-dimensional space comprises data captured by a detection device, other than the mobile device, at a time prior to the detection of the plurality of electromagnetic signals by the mobile device.

7. The system of claim 1, wherein:
the mobile device is configured to detect an input comprising an instruction to determine the location in the three-dimensional space of the mobile device; and
the detection of the plurality of electromagnetic signals in the three-dimensional space is performed in response to detecting the input.

8. The system of claim 1, wherein the system is further configured to generate and display an alert regarding the determined location in the three-dimensional space of the mobile device.

9. The system of claim 1, wherein one or more of the plurality of base stations is positioned inside the three-dimensional space.

10. The system of claim 1, wherein one or more of the plurality of base stations is positioned outside the three-dimensional space.

11. A geolocation method for determining a location in a three-dimensional space, the method performed by a system comprising:
a plurality of base stations, the plurality of base stations configured to receive data via a low-power wide-area network communication;
a mobile device movable about the three-dimensional space, the mobile device comprising a set of one or more detection antennas configured to detect electromagnetic signals in the three-dimensional space and a transmission device configured to transmit signals via the low-power wide-area network communication; and
one or more servers;
wherein the method comprises:
detecting, via the set of one or more detection antennas of the mobile device, a plurality of electromagnetic signals in the three-dimensional space;
generating, at the mobile device, a signal profile based on the plurality of electromagnetic signals, wherein the signal profile comprises information about a subset of the plurality of electromagnetic signals; and
transmitting, via the transmission device of the mobile device using the low-power wide-area network communication, the signal profile to one or more of the plurality of base stations;
determining, by the one or more servers, based on a comparison of the signal profile received by the one or more of the plurality of base stations to stored data regarding signal profiles at a plurality of locations in the three-dimensional space, the location in the three-dimensional space of the mobile device.

12. A non-transitory computer-readable storage medium for determining a location in a three-dimensional space, the storage medium storing instructions configured to be executed by a system comprising:
a plurality of base stations, the plurality of base stations configured to receive data via a low-power wide-area network communication;
a mobile device movable about the three-dimensional space, the mobile device comprising a set of one or more detection antennas configured to detect electromagnetic signals in the three-dimensional space and a transmission device configured to transmit signals via the low-power wide-area network communication; and
one or more servers;
wherein the instructions are configured to cause the system to:
detect, via the set of one or more detection antennas of the mobile device, a plurality of electromagnetic signals in the three-dimensional space;
generate, at the mobile device, a signal profile based on the plurality of electromagnetic signals, wherein the signal profile comprises information about a subset of the plurality of electromagnetic signals; and
transmit, via the transmission device of the mobile device using the low-power wide-area network communication, the signal profile to one or more of the plurality of base stations;
determine, by the one or more servers, based on a comparison of the signal profile received by the one or more of the plurality of base stations to stored data regarding signal profiles at a plurality of locations in the three-dimensional space, the location in the three-dimensional space of the mobile device.

13. A geolocation system for determining a location in a three-dimensional space, the system comprising:
a first device configured to detect a first plurality of electromagnetic signals in the three-dimensional space, the first plurality of signals captured at a plurality of different locations in the three-dimensional space;

a second device configured to detect a second plurality of electromagnetic signals in the three-dimensional space, the second plurality of signals captured at the location in the three-dimensional space; and one or more servers configured to:
- receive, from the first device, data regarding the first plurality of electromagnetic signals, the data including information regarding the plurality of locations at which the first plurality of signals were captured;
- generate and store a model of the three-dimensional space based on the first plurality of electromagnetic signals;
- receive, from the second device, data regarding the second plurality of electromagnetic signals;
- determine, based on a comparison of the second plurality of electromagnetic signals to the model of the three-dimensional space, the location in the three-dimensional space of the single location in the environment.

14. The system of claim 13, wherein:
the data regarding the first plurality of electromagnetic signals comprises a plurality of data points for a first location of the plurality of locations captured at a respective plurality of different points in time; and
generating the model of the three-dimensional space comprises accounting for a variation amongst the plurality of data points for the first location of the plurality of locations.

15. The system of claim 14, wherein accounting for the variation comprises calculating an expected deviation based on the plurality of data points.

16. The system of claim 13, wherein generating the model of the three-dimensional space based on the first plurality of electromagnetic signals comprises applying an adjustment to one or more of the first plurality of signals to generate one or more adjusted signals, wherein the model is generated based on the one or more adjusted signals.

17. The system of claim 16, wherein the adjustment is determined based on a difference between an antenna of the first device and an antenna of the second device.

18. A geolocation method for determining a location in a three-dimensional space, the method performed by a system comprising:
a first device configured to detect a first plurality of electromagnetic signals in the three-dimensional space, the first plurality of signals captured at a plurality of different locations in the three-dimensional space;
a second device configured to detect a second plurality of electromagnetic signals in the three-dimensional space, the second plurality of signals captured at the location in the three-dimensional space; and
one or more servers;
wherein the method comprises:
- receiving, by the one or more servers, from the first device, data regarding the first plurality of electromagnetic signals, the data including information regarding the plurality of locations at which the first plurality of signals were captured;
- generating and storing, by the one or more servers, a model of the three-dimensional space based on the first plurality of electromagnetic signals;
- receiving, by the one or more servers, from the second device, data regarding the second plurality of electromagnetic signals;
- determining, by the one or more servers, based on a comparison of the second plurality of electromagnetic signals to the model of the three-dimensional space, the location in the three-dimensional space of the single location in the environment.

19. A non-transitory computer-readable storage medium for determining a location in a three-dimensional space, the storage medium storing instructions configured to be executed by a system comprising:
a first device configured to detect a first plurality of electromagnetic signals in the three-dimensional space, the first plurality of signals captured at a plurality of different locations in the t three-dimensional space;
a second device configured to detect a second plurality of electromagnetic signals in the three-dimensional space, the second plurality of signals captured at the location in the three-dimensional space; and
one or more servers;
wherein the instructions are configured to cause the system to:
- receive, by the one or more servers, from the first device, data regarding the first plurality of electromagnetic signals, the data including information regarding the plurality of locations at which the first plurality of signals were captured;
- generate and store, by the one or more servers, a model of the three-dimensional space based on the first plurality of electromagnetic signals;
- receive, by the one or more servers, from the second device, data regarding the second plurality of electromagnetic signals;
- determine, by the one or more servers, based on a comparison of the second plurality of electromagnetic signals to the model of the three-dimensional space, the location in the three-dimensional space.

* * * * *